United States Patent
Kamo

(10) Patent No.: US 6,744,733 B2
(45) Date of Patent: *Jun. 1, 2004

(54) NETWORK SYSTEM

(75) Inventor: Toshiyuki Kamo, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,074

(22) Filed: Sep. 24, 1998

(65) Prior Publication Data

US 2004/0017812 A1 Jan. 29, 2004

(30) Foreign Application Priority Data

Mar. 20, 1998 (JP) .................................. 10-072819

(51) Int. Cl.⁷ .............................................. G01R 31/08
(52) U.S. Cl. .............................. 370/236.1; 370/236.2; 370/230; 370/395.63; 370/395.64
(58) Field of Search .......................... 370/236.1, 236.2, 370/395.1, 395.53, 401, 395.41, 230, 230.1, 231, 235, 235.1, 236, 237, 395.64, 395.65, 402

(56) References Cited

U.S. PATENT DOCUMENTS 5,732,071 A * 3/1998 Saito et al. ................. 370/255
6,144,636 A * 11/2000 Aimoto et al. ............... 370/229
6,208,653 B1 * 3/2001 Ogawa et al. ............... 370/395
6,314,098 B1 * 11/2001 Masuda et al. .............. 370/392
6,337,863 B1 * 1/2002 Nair et al. ................... 370/395
6,414,939 B1 * 7/2002 Yamato .................... 370/236.1
6,438,138 B1 * 8/2002 Kamiya ....................... 370/468
2001/0055313 A1 * 12/2001 Yin et al. .................... 370/466

FOREIGN PATENT DOCUMENTS

| JP | 6268747 | 9/1994 |
|----|---------|--------|
| JP | 7182264 | 7/1995 |
| JP | 8286989 | 11/1996 |
| JP | 9214544 | 8/1997 |

* cited by examiner

Primary Examiner—Alpus H. Hsu
Assistant Examiner—Thien D Tran
(74) Attorney, Agent, or Firm—Katten Muchin Zavis Rosenman

(57) ABSTRACT

A plurality of bridges accommodating LANs are connected through an ATM network in a network system of the present invention. When a specified bridge is newly connected to this ATM network, the specified bridge transmits a request for setting point-to-multipoint transmission SVCs towards other bridges. These other bridges, when receiving the setting request from the specified bridge, execute a process of setting the point-to-multipoint transmission SVCs with respect to the specified bridge.

27 Claims, 26 Drawing Sheets

FIG.9

| | |
|---|---|
| 1~5 | ATM Cell Header |
| 6 | ID |
| 7 | DIR \| BN \| CI \| NI \| PA \| Reserve |
| 8~9 | ER |
| 10~11 | CCR |
| 12~13 | MCR |
| 14~17 | QL |
| 18~21 | SN |
| 22~51 | Reserved |
| 52 | Reserved \| CRC-10 |
| 53 | CRC-10 |

FIG.10

| FIELD | OCTET | BIT | CONTENT | INITIAL VALUE | |
|---|---|---|---|---|---|
| | | | | (ROOT) SOURCE GENERATION RM CELL | SWITCH GENERATION RM CELL (LEAF) OR DESTINATION GENERATION RM CELL |
| Header | 1-5 | all | ATM HEADER | RM-VPC:VCI=6 and PTI=110<br>RM-VCC:PTI=110 | |
| ID | 6 | all | PROTOCOL IDENTIFIER | 1 | |
| DIR | 7 | 8 | DIRECTION INDICATION BIT | 0 (FORWARD DIRECTION) | 1 (BACKWARD DIRECTION) |
| BN | 7 | 7 | BECN CELL INDICATION | 0 | 1 |
| CI | 7 | 6 | CONGESTION INDICATION BIT | 0 | EITHER C1=1 OR N1=1 OR BOTH |
| NI | 7 | 5 | No Increase | 0or1 | |
| RA | 7 | 4 | Request Acknowledge | BASED ON 0 OR I.371 | |
| Reserved | 7 | 3-1 | Reserved | 0 | |
| ER | 8-9 | all | Explicit CellRate | RATE UNDER PCR | any rate value |
| CCR | 10-11 | all | Current Cell Rate | ACR | 0 |
| MCR | 12-13 | all | Minimum Cell Rate | MCR | 0 |
| QL | 14-17 | all | Queue Length | BASED ON 0 OR I.371 | |
| SN | 18-21 | all | Sequence Number | BASED ON 0 OR I.371 | |
| Reserved | 22-51 | all | Reserved | EACH OCTET IS 6A(hex) | |
| Reserved | 52 | 8-3 | Reserved | 0 | |
| CRC-10 | 52 | 2-1 | CRC-10 | | |
| | 53 | all | | | |

FIG.11

| NAME | CONTENT | UNIT | RANGE |
|---|---|---|---|
| PCR | PEAK CELL RATE AT WHICH SOURCE IS UNABLE TO EXCEED | cell/sec | Note 1 |
| MCR | MINIMUM CELL RATE AT WHICH SOURCE IS ALWAYS PERMITTED TO TRANSMIT | cell/sec | Note 1 |
| ICR | INITIAL CELL RATE AT WHICH SOURCE MUST ABIDE BY AT THE INITIAL STAGE AND AFTER IDLE RERIOD | cell/sec | Note 1 |
| RIF | RATE INCREASE FACTOR DEFINED AS PARAMETER FOR CONTROLLING INCREASE QUANTITY IN CASE OF INCREASING CELL RATE WHEN SOURCE RECEIVES RM CELL | POWER OF RIF. 2 | 1/32.768~1 |
| Nrm | MAXIMUM VALUE OF NUMBER OF CELLS BETWEEN FORWAED RM CELLS | POWER OF 2 | 2~256 |
| Mrm | PARAMETER FOR CONTROLLING ALLOCATION OF BANDWIDTH BETWEEN FORWARD RM CELL, BACKWARD RM CELL AND DATA CELL | FIXED VALUE =2 | |
| RDF | RATE DECREASE FACTOR DEFINED AS PARAMETER FORCONTROLLING DECREASE QUANTITY OF CELL RATE | POWER OF 2 | 1/32.768~1 |
| ACR | ALLOWED CELL RATE SHOWING PRESENT RATE AT WHICH SOURCE IS ABLE TO TRANSMIT | cell/sec | |
| CRM | MISSING RM CELL COUNT DEFINED AS PARAMETER FOR RESTRICTING NUMBER OF FORWARD RM CELLS TRANSMITTED DURING RERIOD WHEN SOURCE DOSE NOT RECEIVE BACKWARD RM CELL | INTEGER VALUE | implementation specific |
| ADTF | ACR DECREASE TIME FACTOR SHOWING ALLOWABLE TIME OF RM CELL TRANSMITTING INTERVAL BEFORE RATE IS DECREASED TO ICR | sec | 0.01~10.23 sec 10ms granularity |
| Trm | UPPER LIMIT OF FORWARD RM CELL INTERVAL OF ACTIVE VC | msec | Trm= $100*2^{-7}$~$100*2^0$ |
| FRTT | FIXED ROUND TRIP TIME SHOWING TOTAL SUM OF FIXED DELAY AND PROPAGATION DELAY TILL CELL IS TRANSMITTED FROM SOURCE TO DESTINATION AND RETURNED IS | msec | 0~16.700 |
| TBE | TRANSIENT BUFFER EXPOSURE DEFINED AS PARAMETER FOR RESTRICTING NUMBER OF CELLS TRANSMITTED BY SOURCE DURING PERIOD TILL FIRST FORWARD CELL TRANSMITTED BY SOURCE IS RETURNED | cell | 0~16.777.215 |
| CDF | CUTOFF DECREASE FACTOR FOR CONTROLLING DECREASE IN ACR DECREASED BY CRM RESTRICTION | POWER OR 0 OR 2 | 1/64~1 |
| TCR | TAGGER CELL RATE FOR RESTRICTING RATE OF FORWARD RM CELL TRANSMITTED BY SOURCE ON OUT-OF-RATE BASIS | FIXED VALUE =10 CELL/SEC | |

NOTE1: RATE IS SET BY 24-BIT INTEGER VALUE WITH MINIMUM VALUE "0" AND MAXIMUM VALUE "16.777.215" (WHEN SETTING CALL).
RM CELL, HOWEVER, USES 16-BIT FLOATING-POINT REPRESENTATION WITH MAXIMUM VALUE "4.290.772.992."

FIG.18

| Bytes | | | | | | |
|---|---|---|---|---|---|---|
| 1~5 | ATM Cell Header | | | | | |
| 6 | ID | | | | | |
| 7 | DIR | BN | CI | NI | PA | Reserve |
| 8~9 | ER | | | | | |
| 10~11 | CCR | | | | | |
| 12~13 | MCR | | | | | |
| 14~17 | QL | | | | | |
| 18~21 | SN | | | | | |
| 22~51 | "Lesf ID" | | | | | |
| 52 | Reserved | | | | | CRC-10 |
| 53 | CRC-10 | | | | | |

FIG.22

|   | 8 | 7 | 6 | 5 | 4 | 3 | 2 | 1 |
|---|---|---|---|---|---|---|---|---|
| n | \multicolumn{8}{c|}{LEAF IDENTIFICATION NUMBER} |
|   | x | x | x | x | x | x | x | x |
| N+1 | \multicolumn{8}{c|}{VALUE OF LEAF IDENTIFICATION NUMBER} |
| N+2 |  |  |  |  |  |  |  |  |

NETWORK SYSTEM

BACKGROUND OF THE INVENTION

The present invention relates to a network system using an ATM network as a relay network to LANs (Local Area Networks).

In recent years, applied technologies using an ATM (Asynchronous Transfer Mode) have been increasingly developed, and services utilizing the ATM have also been developed and utilized. In particular, when using an ATM network in the case of using Internet, multimedia services according the TCP/IP (Transmission Control Protocol/ Internet Protocol) are provided with a proper QOS (Quality of Service). Under such circumstances, some technologies (ATM-LAN) using the ATM network as a relay network to LANs are proposed.

The plurality of LANs are connected through the ATM network and treated as being logically one LAN, in which case the respective LANs are connected by remote bridge (hereinafter simply referred to as "bridges"). A technology of connecting the plurality of LANs through the ATM network used as a relay network has already been proposed in the invention disclosed in Japanese Patent Application Publication No.7-202908 (referred to as a "preceding intention (1)") and in the invention disclosed in Japanese Patent Application Publication No.8-8917 (referred to as a "second preceding invention (2)").

FIGS. 25 and 26 are explanatory diagrams showing the preceding invention (1). As illustrated in FIG. 25, LANs 1–3 are connected through bridges A–C to an ATM network. The bridge A is connected to the bridges B and C through a point-to-point transmission PVC (Permanent Virtual Connection) and a point-to-multipoint transmission PVC. Data packets transmitted from a LAN 1 to LANs 2, 3 are transmitted on the above connections in the ATM network ((between the bridges) in such a state that a plurality of ATM cells (hereinafter simply called "cells") are stored with the data packets.

If a destination physical address (which is also called an MAC (Media Access Control) address) of the packet can be specified, each of the bridges A–C transmits the packets (the cells) to the bridge accommodating a transmission party (LAN) by use of the is point-to-point PVC. On the other hand, if unable to specify the MAC address of the packet (or if broadcasting of the MAC address is designated), each of the bridges A–C transmits the all the packets (the cells) to other bridges by using the point-to-multipoint PVCs.

Further, as shown in FIG. 26, when the plurality of LANs 1–4 are connected through the bridges A–D to the ATM network, the bridges A–D are connected in mesh by the point-to-point PVCs and further connected by the point-to- multipoint PVCs. What is shown as the PVCs in FIG. 26 is, however, only the point-to-multipoint PVCs for connecting the bridge A to other bridges B–d.

The bridge in many cases transfers the packets (frames) received from the LAN to all other bridges (LANs). Therefore, for example, the bridge A shown in FIG. 26 prepares the packets corresponding to the number of other bridges ("3" in the example in FIG. 26), then converts the prepared packets into the cells, and transfers the data to the bridges B–D by using the point-to-multipoint PVCs.

Moreover, according to the preceding invention (2), as in the preceding invention (1), the bridges are connected through the point-to-point SVCs (Switched Virtual Connections) and the point-to-multipoint PVCs. In the preceding invention (2), however, the point-to-point SVC is established or disconnected corresponding to a condition of throughput of the ATM network. In the preceding invention (2), resources (e.g., buffer memories for retaining the cells) are thereby effectively utilized.

There arise, however, the following problems inherent in the preceding inventions (1) and (2). To be specific, the point-to-point and point-to-multipoint connections in the preceding invention (1) are the permanent virtual connections. Therefore, these connections occupy the resources of the ATM network at all times regardless of a necessity or non-necessity for transmitting the packets.

This might cause a possibility in which an operational flexibility of the ATM network declines.

Further, according to the preceding invention (1), the bridges are connected through the PVCs. Hence, if a new LAN is connected to the ATM network, a maintenance person of the network must set the connections between a newly installed bridge and other bridges, which is laborious.

On the other hand, in the preceding invention (2), the point-to-point SVC is established in accordance with a necessity for transmitting the packets between the bridges. If a congestion occurs in the ATM network before the SVC is established, however, the resources can not be ensured, resulting in a possibility where the SVC might not be established. Namely, there might be a feasibility in which the packet transmission between the bridges can not be assured. Furthermore, in the preceding invention (2) also, the point- to-multipoint connection is set based on the PVC, and hence the maintenance becomes laborious as in the case of the preceding invention (1).

SUMMARY OF THE INVENTION

It is a primary object of the present invention, which overcomes the problems described above, to provide a network system capable of relieving a laborious operation of a maintenance person of an ATM network and enhancing an assurance of a packet transmission in the ATM network.

To accomplish this object, according to a first aspect of the present invention, a network system comprises a ATM network, and a plurality of bridges connected through the ATM network. In this network system, a specified bridge among the plurality of bridges sends a request for setting a switched virtual connection for a point-to-multipoint transmission, towards any one of bridge among other bridges. Each of said other bridges, when receiving the setting request sent from the specified bridge, sets the switched virtual connection for point-to-multipoint transmission between the specified bridge and the other bridge.

According to the first aspect of the present invention, when the bridge is newly connected to the ATM network, this bridge becomes a specified bridge, and the switched virtual connection for point-to-multipoint transmission (SVC) is automatically set between this bridge and other bridge. Consequently, there is relieved a laborious operation by the maintenance person of the network which is con- comitant with the new installation of the bridge.

According to a second aspect of the present invention, a network system comprises a ATM network, and a plurality of bridges connected through the ATM network. In this network system, each of the bridges is connected to each of other bridges through a connection for point-to-point trans- mission. Each of the bridges, if there is an unused connec- tion among the connections accommodated in the bridge, gives the ATM network a rate decreasing message for decreasing a transmission rate of the unused connection. The ATM network, when receiving the rate decreasing message, decreases the transmission rate of the unused connection by releasing resources allocated to the unused connection, and allocates the released resources to a other connection.

According to the second aspect of the present invention, the resources of the unused connection are allocated to a other connection, and hence the resources of the ATM network can be effectively utilized. In this case, the connection is not disconnected and established as done in the prior art, and it is therefore feasible to eliminate such a case that the packets can not be transmitted because of the connection being unable to be established. Namely, an assurance of the packet transmission in the ATM network can be more enhanced. The connection for connecting the bridge equipments to each other may involve the use of the PVC or the SVC.

These together with other objects and advantages which will be subsequently apparent, reside in the details of construction and operation as more fully hereinafter described and claimed, reference being had to be accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which:

FIG. 9 is an explanatory diagram showing a format of an RM cell;

FIG. 10 is a table for explaining the format of the RM cell;

FIG. 11 is a table showing parameters of ABR;

FIG. 18 is an explanatory diagram showing a format of the RM cell;

FIG. 22 is an explanatory diagram showing a signaling message;

DESCRIPTION OF THE PREFERRED EMBODIMENTS

Embodiments of the present invention will hereinafter be discussed with reference to the accompanying drawings.

[Embodiment 1]

Figure 1:
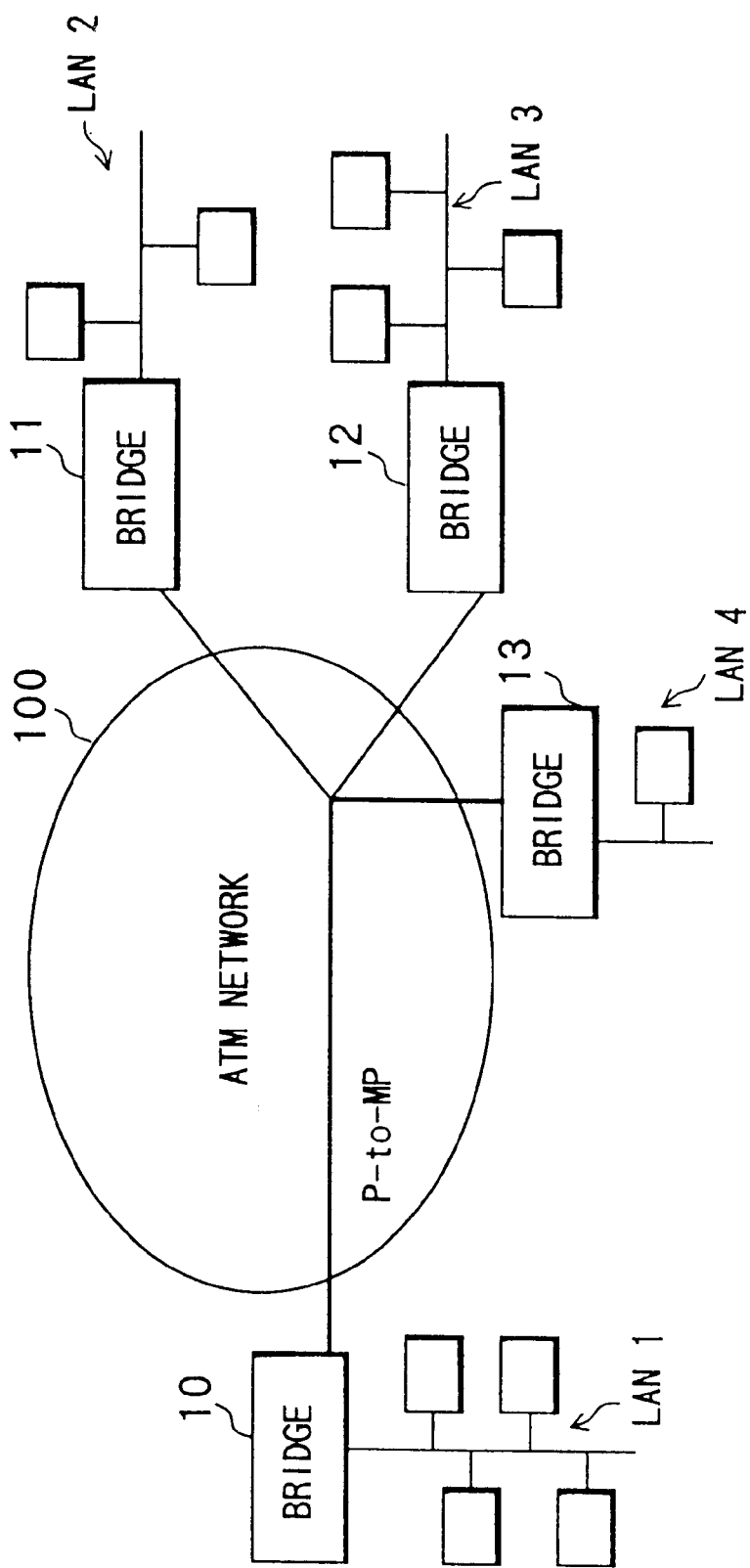
FIG. 1 is a diagram illustrating a network system architecture in an embodiment 1.

FIG. 1 is a diagram illustrating an example of architecture of a network system in an embodiment 1 of the present invention. FIG. 1 shows the network system in which there are provided LANs 1–4 with an ATM network 100 serving as a relay network (ATM-LANs). The LANs 1–4 are, in order to function as being logically one LAN, connected through bridges 10–13 to the ATM network 100. Each of the LANs 1–4 is based on Ethernet and physically constructed of a plurality of computer terminal devices (PCs workstations and server equipments) connected to each other through communication lines.

Figure 6:
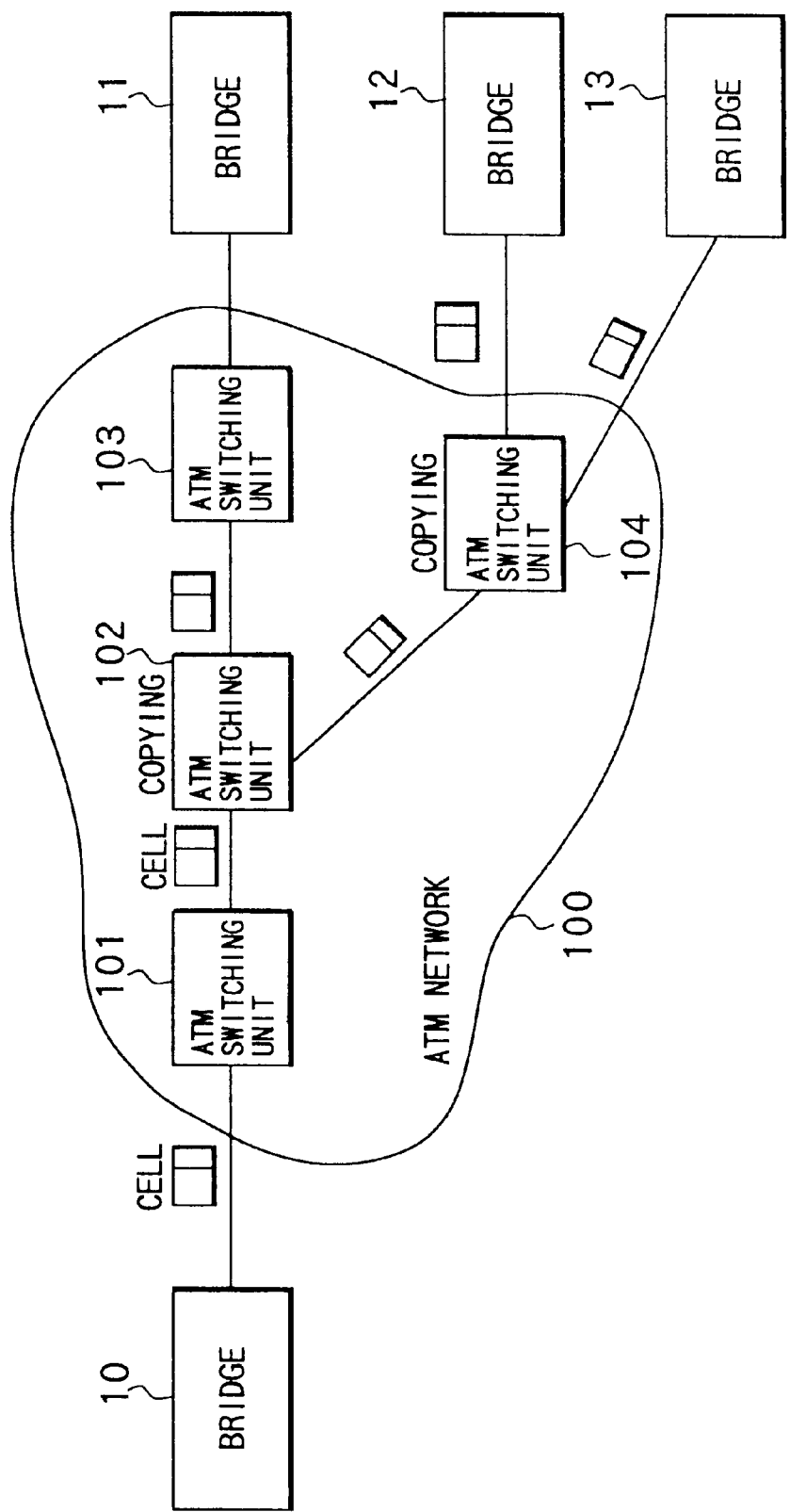
FIG. 6 is an explanatory diagram showing the ATM network.

The ATM network 100 is constructed of a plurality of nodes (ATM switching units, ATM routers etc) connected in mesh through the communication lines, and transmit cells forwarded from the respective bridges 10–13 to a destination bridge. In accordance with the embodiment 1, the ATM network 100 includes ATM switching units 101–104 defined as nodes (see FIG. 6).

Each of the bridges 10–13 is constructed based on IEEE802.1 and classified as a remote transparent bridge incorporating a "no-frills bridge" function, a "learning bridge" function and a function using a spanning tree algorithm.

The respective bridges 10–13 are connected to other bridges through SVCs for a point-to-point transmission and SVCs for a point-to-multipoint transmission. FIG. 1, however, shows only the connection for the point-to-multipoint transmission in a case where the bridge 10 serves as a root, while the bridges 11–13 serve as leaves. Each of the bridges 10–13, when newly connected to the ATM network 100, sets the point-to-multipoint transmission SVC.

Figure 2:
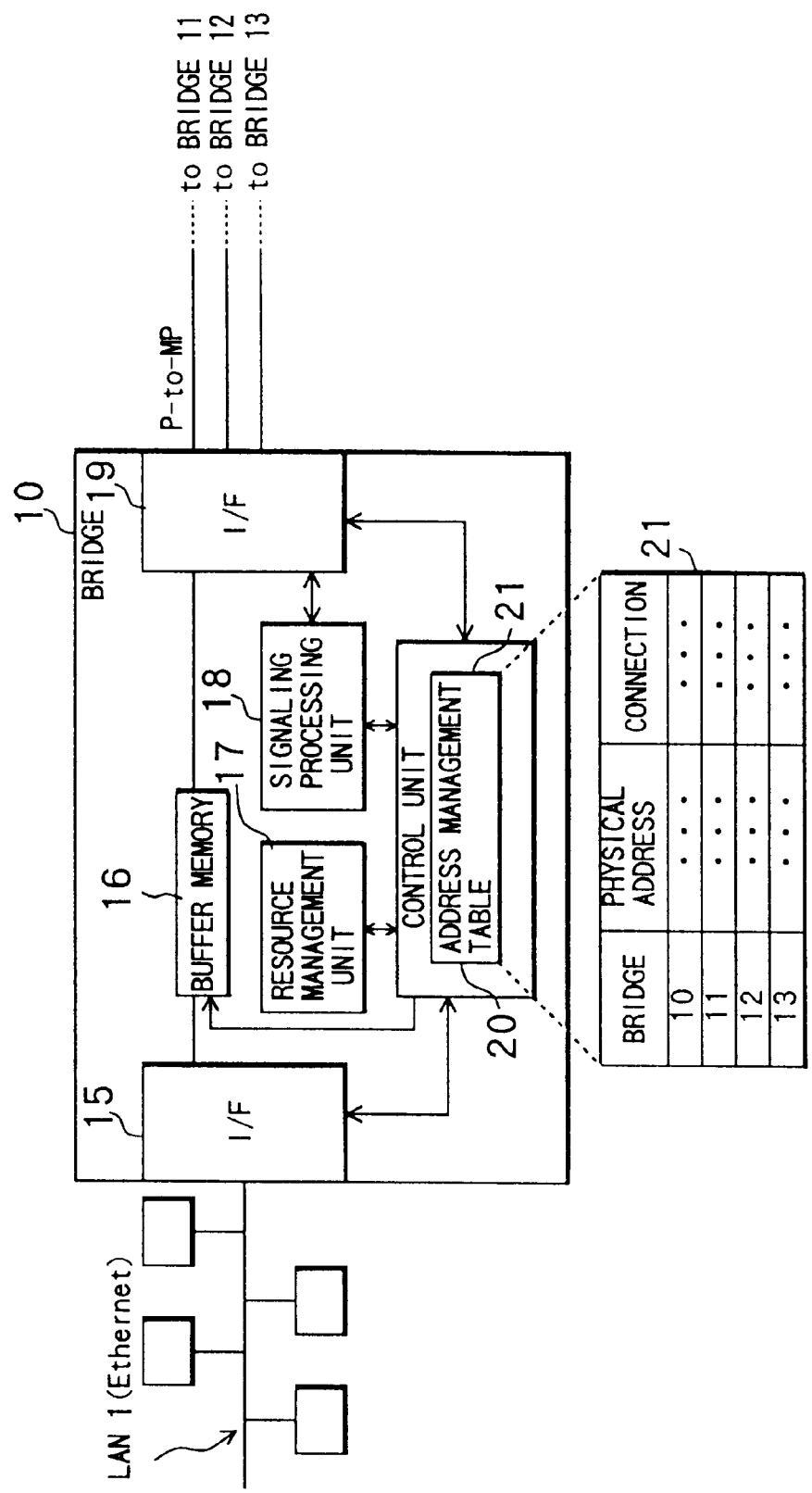
FIG. 2 is a diagram showing a construction of a bridge shown in FIG. 1.

FIG. 2 shows a construction of the bridge shown in FIG. 1. The bridges 10–13 shown in FIG. 1 each have the same construction. Therefore, the bridge 10 will be exemplified. FIG. 2 illustrates the components of the bridge 10 which are essential for actualizing the present invention.

Referring to FIG. 2, the bridge 10 includes an interface 15, a buffer memory 16, a resource management unit 17, a signaling processing unit 18, an interface (I/F) 19 and a control unit 20.

The interface 15 accommodates a LAN circuit and receives an input of a packet (frame) sent from each of the terminal devices of the LAN 1. The interface 15, if the inputted packet should be forwarded to the ATM network 100, segments the packet at an interval of a predetermined length (adapted to a storage in an information field of a cell (based on, e.g., AAL TypeS) in accordance with an AAL (ATM Adaptation Layer) protocol, and sends it towards the buffer memory 16. On the other hand, the packet transmitted from the buffer memory 16 is inputted to the interface 15. In this case, the interface 15 forwards the packet towards the LAN 1 according to an indication of the control unit 20.

The buffer memory 16 is constructed of a buffer (called a upward buffer) in an upward direction (LAN 1→ATM network 100 direction: forward direction) and a buffer (called a downward buffer) in a downward direction (ATM network 100→LAN 1 direction: backward direction). The upward buffer consists of a plurality of queues (FIFO: first-in first-out) prepared corresponding to connections set between the bridges. The packets sent from the interface 15 are accumulated in a relevant queue. The packets accumulated in each queue are transmitted towards the interface 19 in accordance with an indication of the control unit 20 (corresponding to a transmission bit-rate of the connection). On the other hand, the downward buffer accumulates the packets sent from the interface 19. The packets accumulated in the downward buffer are transmitted towards the interface 15 according to the indication of the control unit 20.

The interface 19, when the packet (a part of information field of a cell) transmitted from the buffer memory 16 are inputted thereto, adds a cell header to this packet in accordance with the ATM layer protocol. The cell is thereby generated. The interface 19 transmits the thus generated cell to a relevant connection. On the other hand, the interface 19 receives a plurality of cells transmitted through the connection. In this case, the interface 19 assembles the original packet by detaching the cell header from each cell, and transmits this packet towards the buffer memory 16.

The resource management unit 17 manages resources (the buffer memory 16 etc) of the ATM network 100. The resource management unit 17 specifies a VPI/VCI of the connection that should be set in response to a request of the control unit 20. The resource management unit 17 ensures the resource of the specified VPI/VCI, and notifies the control unit 20 of this purport.

The signaling processing unit 18 is constructed of an LSI and an ASIC etc. The signaling processing unit 18 edits a signaling message in accordance with the indication of the control unit 20, and supplies this message to the interface 19. On the other hand, the signaling processing unit 18 receives the signaling message from the interface 19, and notifies the control unit 20 of a content of this message.

The control unit 20 consists essentially of a CPU (Central Processing Unit) and a memory. The control unit 20 executes a control program stored in the memory, thereby executing an SVC setting process for a point-to-multipoint transmission which will hereinafter be mentioned. Further, the control unit 20 includes an address management table 21 of each of the bridges 10–13.

The address management table 21 retains as entries serial numbers, connections (VPI/VCI) and physical addresses of the bridges 10–13, wherein a corresponding entry is retrievable with any one of these items serving as a key. It is to be noted that if the bridge is newly installed, a storage content of the address management table 21 is previously set by a maintenance person of the network system.

Given hereinafter is an explanation of an operation of each of the bridges 10, 11 when the bridge 10 shown in FIG. 1 is newly connected to the ATM network 100. To be specific, the operation of each of the bridges 10, 11 is explained in a case where the bridge 10 becomes a root, while the bridge 11 becomes a leaf, and the point-to-multipoint transmission SVC is set between the bridge 10 and the bridge 11.

Figure 3:
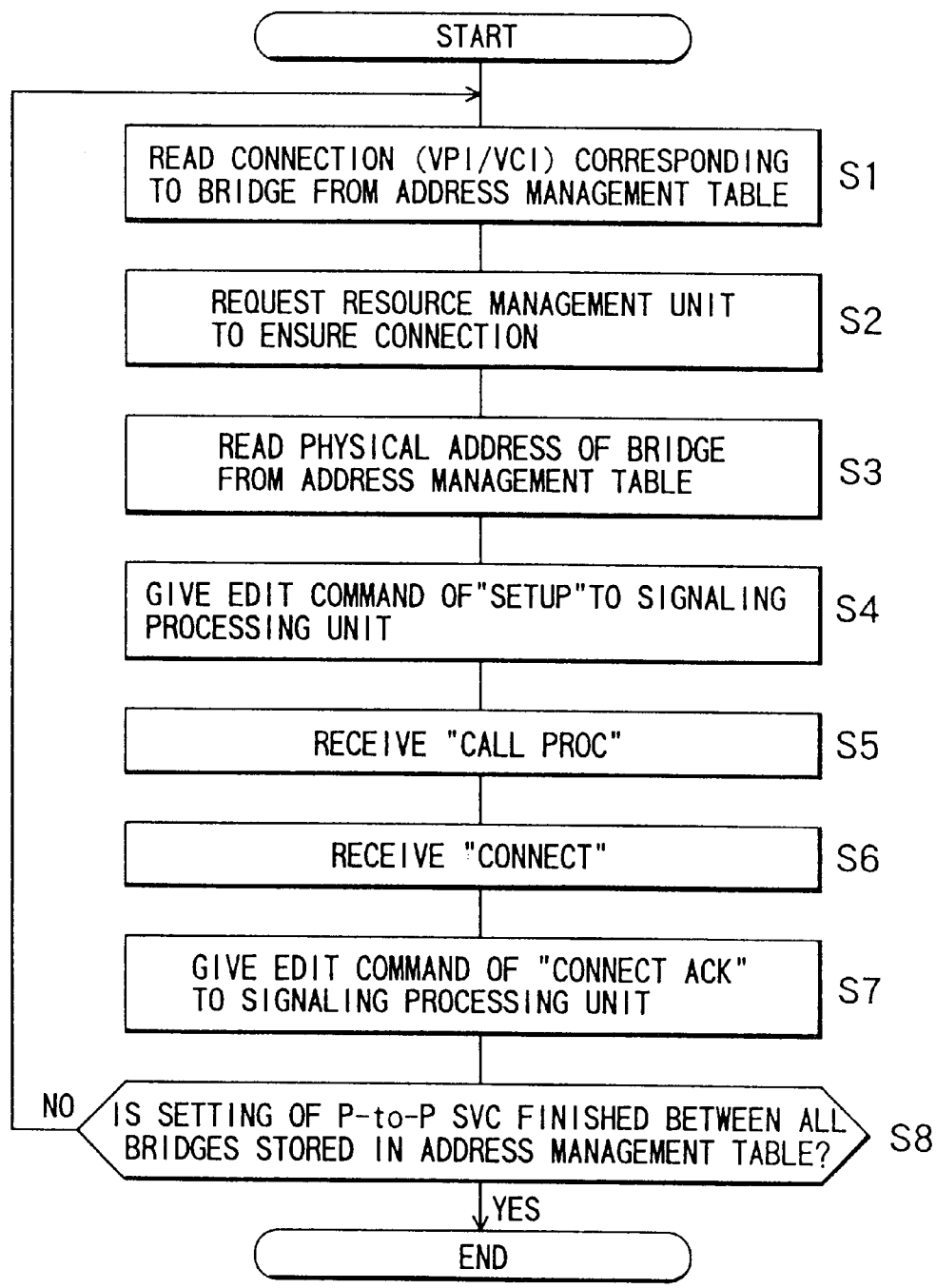
FIG. 3 is a flowchart showing an SVC setting process.
Figure 4:
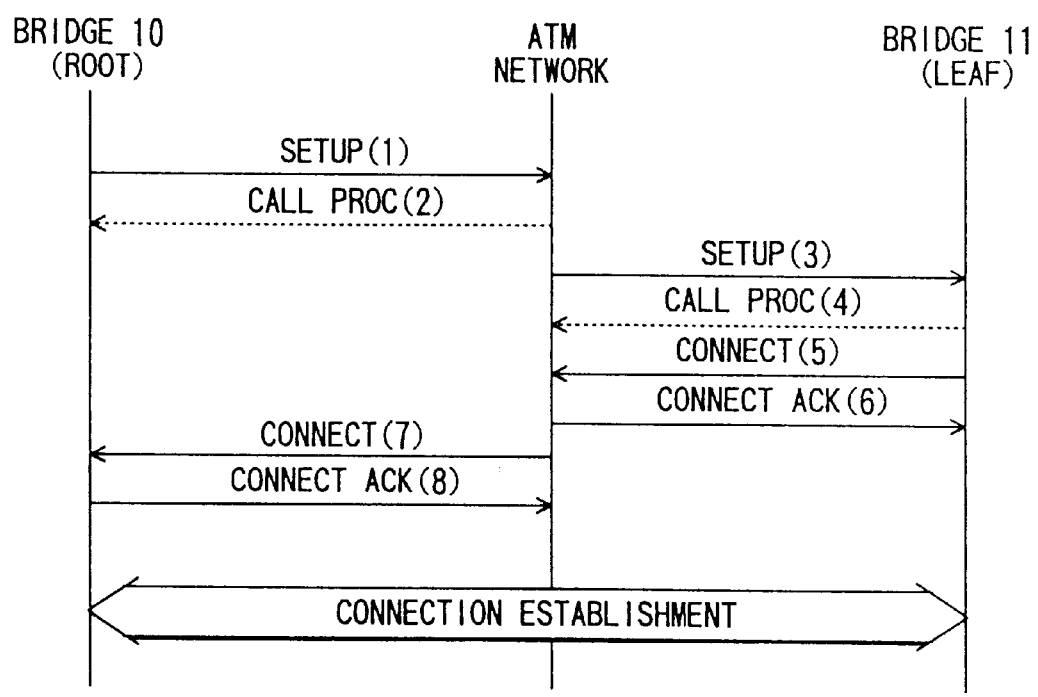
FIG. 4 is a sequence diagram showing a signaling procedure for setting an SVC.
Figure 5:
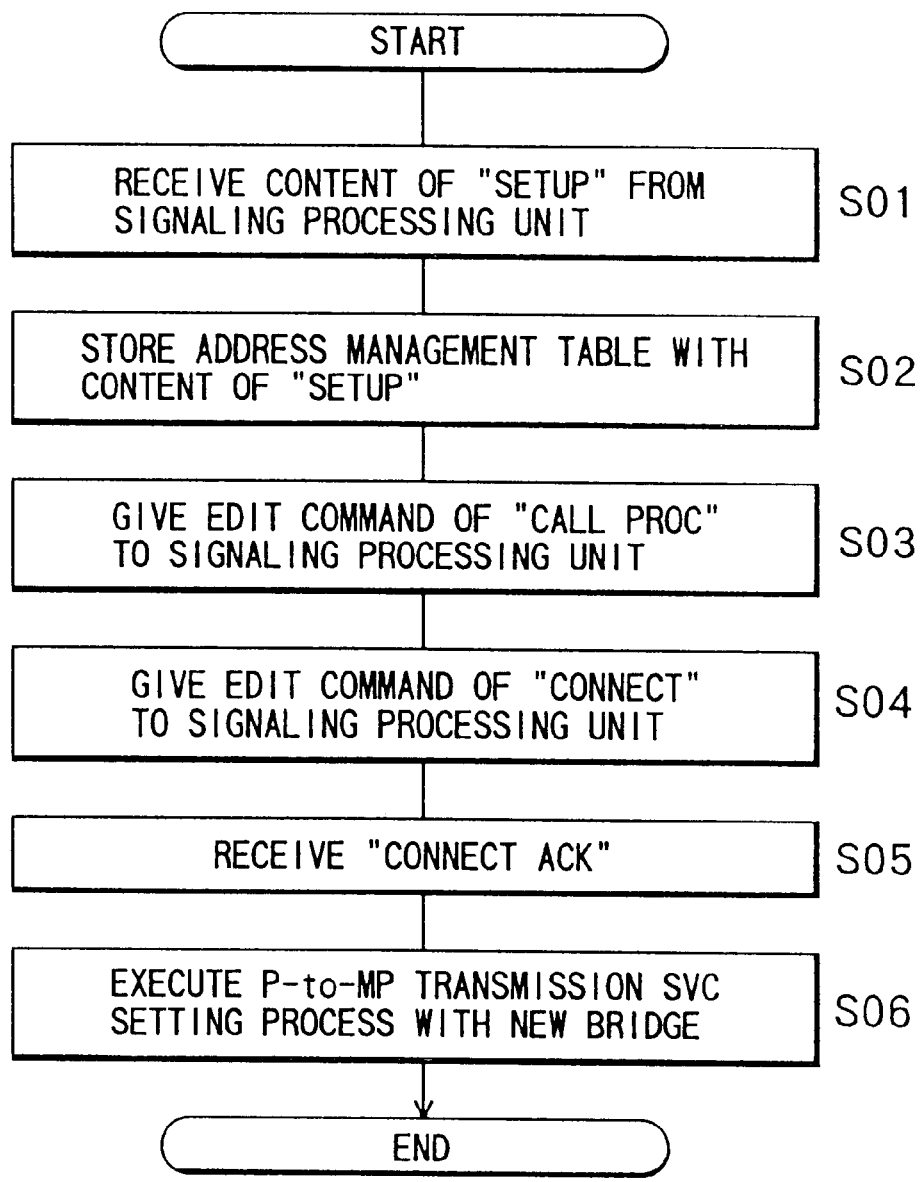
FIG. 5 is a flowchart showing the SVC setting process.

FIG. 3 is a flowchart showing an SVC setting process by the control unit 20 of the bridge 10. FIG. 4 is a sequence diagram showing a signaling procedure implemented between the bridges 10 and 11. FIG. 5 is a flowchart showing an SVC setting process by the control unit 20 of the bridge 11.

The control unit 20 of the bridge 10, in a state of being connected to the ATM network 100, for example, upon switching ON the power supply, starts executing the SVC setting process shown in FIG. 3. This SVC setting process is executed according to the Recommendations Q.2971 and Q.27771.1 of the ITU-T.

To begin with, the control unit 20 reads a connection (VPI/VCI) corresponding to the bridge 11 from the address management table 21 (S1), and requests the resource management unit 17 for ensure this connection and also a connection for signaling (S2).

The resource management unit 17, upon receiving the request from the control unit 20, ensures the resource for the SVC and notifies the control unit 20 of this purport.

The control unit 20, when receiving this notification from the resource management unit 17, reads a serial number and a physical address of the bridge 11 out of the address management table 21 (S3), and supplies the signaling processing unit 18 with these items as an edit command of a signaling message "SETUP" (S4). This message "SETUP" corresponds to a request for setting a switched virtual connection according to the present invention.

The signaling processing unit 18, upon receiving the edit command of the control unit 20, generates "SETUP" containing a serial number and a physical address of the bridge 10, and imparts "SETUP" to the interface 19. The interface 19 sends "SETUP" to the signaling connection.

With this process, as shown in FIG. 4, "SETUP" is transmitted to the ATM network 100 (see FIG. 4(1)). Thereupon, the ATM network 100 transmits to the bridge 10 "CALL PROC" defined as a response message to "SETUP" (see FIG. 4(2)). The control unit 20 of the bridge 10 thereby receives from the signaling processing unit 18 the notification purporting that "CALL PROC" has been received (S5). Thereafter, as shown in FIG. 4 the ATM network 100 transmits "SETUP" to the bridge 11 (see FIG. (3)).

When the bridge 11 receives "SETUP", the control unit 20 of the bridge 11 starts the SVC setting process shown in FIG. 5. More specifically, as shown in FIG. 5, the control unit 20 of the bridge 11 receives from the signaling processing unit 18 a message content (the serial number of the transmitting equipment (the bridge 10), the physical address of the bridge 10, and the VPI/VCI for setting the SVC) (S01), and stores the address management table 21 with these items (S02).

Subsequently, the control unit 20 gives the signaling processing unit 18 an edit command of the response message "CALL PROC" to "SETUP" (S03). Thereupon, the signaling processing unit 18 generates "CALL PROC" which is transmitted from the interface 19 to the ATM network 100 (see FIG. 4(4)).

Subsequently, the control unit 20 gives the signaling processing unit 18 an edit command of a connection setting message "CONNECT" (S04). Then, the signaling processing unit 18 generates "CONNECT", and this message "CONNECT" is transmitted from the interface 19 to the ATM network 100 (see FIG. 4(5)). Thereafter, the bridge 11 receives from the ATM network 100 an acknowledgement message "CONNECT ACK" in response to "CONNECT" (S05: see FIG. 4(6)).

At this time, as shown in FIG. 4, in the ATM network 100, after "CONNECT ACK" has been transmitted to the bridge 11, nodes existing on an intra-network connection between the bridge 10 and the bridge 11 establish a connection, and "CONNECT" is finally transmitted to the bridge 10 from the ATM network 100 (see FIG. 4(8)).

Then, as shown in FIG. 3, the control unit 20 of the bridge 10 accepts the purport that the signaling processing unit 18 has received "CONNECT" (S6), and gives the signaling processing unit 18 an edit command of the acknowledgement message "CONNECT ACK" with respect to "CONNECT" (S7). Thus, the bridge 10 establishes the SVC for the point-to-multipoint transmission between the bridge 11 and the bridge 10 itself.

Thereafter, the control unit 20 of the bridge 10 judges whether or not the SVCs for the point-to-multipoint transmission are set between the bridge 10 itself and all the bridges (the bridges 11–13 in this embodiment) previously stored in the address management table 21 (S8). At this time, the control unit 20, when judging that the SVCs are set (S8; YES), finishes the SVC setting process and, when judging that the SVCs are not set (S8; NO), executes repeatedly the processes in S1–S8 . The bridge 10 thereby establishes the SVCs for the point-to-multipoint transmission between the bridges 11–13 and the bridge 10 itself.

On the other hand, the bridge 11, when receiving "CONNECT ACK" from the ATM network 100, executes the SVC setting process for the point-to-multipoint transmission between the bridge 10 and the bridge 11 itself, wherein the bridge 11 serves as the root while the bridge 10 serves as the leaf (see S06 in FIG. 5). This SVC setting process is the same as the process shown in FIGS. 3–5, and hence the explanation thereof is omitted. Thereafter, the control unit 20 of the bridge 11 finishes the SVC setting process.

Similarly, each of the bridges 12, 13 executes the SVC setting process for the point-to-multipoint transmission shown in FIG. 5 between the bridge 10 and the bridge 12 or 13 itself. In the end, the bridge 10 thereby establishes the SVC for the point-to-multipoint transmission with respect to each of the bridges 11–13, and also each of the bridges 11–13 establishes the SVC for the point-to-multipoint transmission with respect to the bridge 10.

Thereafter, for instance, the packet is inputted to the bridge 10 from the LAN 1, and, if the bridge 10 is unable to judge which side, the LAN 1 or the ATM network 100, an MAC address of this packet exists, (the cell stored with) this packet transmitted from the interface 19 to the SVC for the point-to-multipoint transmission. In the ATM network 100, as exemplified in FIG. 6, the packets are copied in the nodes (the ATM switching units 102, 104) having different outgoing routes (outgoing VCs) to other bridges and transmitted from the outgoing routes directed to the respective bridges. With this process, the same packets are transmitted to each of the bridges 11–13.

As described above, in the network system in the embodiment 1, when the new bridge is connected to the ATM network 100, the point-to-multipoint transmission SVC is automatically set between the bridges. Hence, there is no necessity for the maintenance person of the network to set the connection for the point-to-multipoint transmission between the bridges as needed in the prior art. Accordingly, the laborious operations of the maintenance person are relieved.

Note that when each of the bridges 11–13 sets the point-to-multipoint transmission SVC between the bridge 10 and the concerned bridge itself, the SVC may be established in a signaling procedure of "Leaf Initiate" prescribed in "ATM UNI Signaling, Version 4.0" in the ATM forum.

[Embodiment 2]

Figure 7:
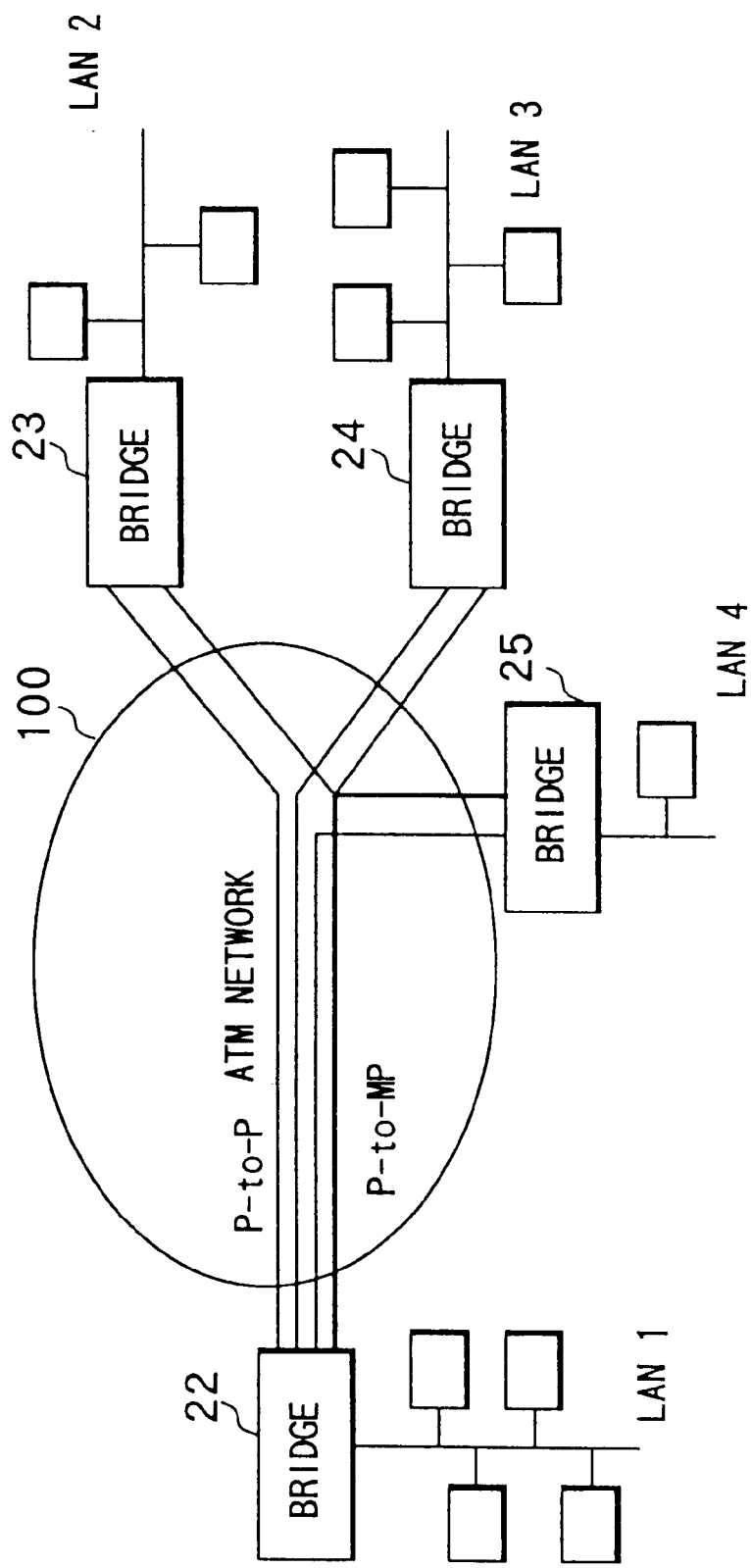
FIG. 7 is a diagram showing a network system architecture in an embodiment 2.

FIG. 7 is a diagram showing an architecture of the network system in an embodiment 2. As illustrated in FIG. 2, the embodiment 2 has points common to the embodiment 1, and hence differences therebetween are mainly explained. In the network system in the embodiment 2, bridges 22–25 accommodating LANs 1–4 are connected through connections (irrespective of the PVC or the SVC) for point-to-point transmission as well as through connections for the point-to-multipoint transmission.

Figure 8:
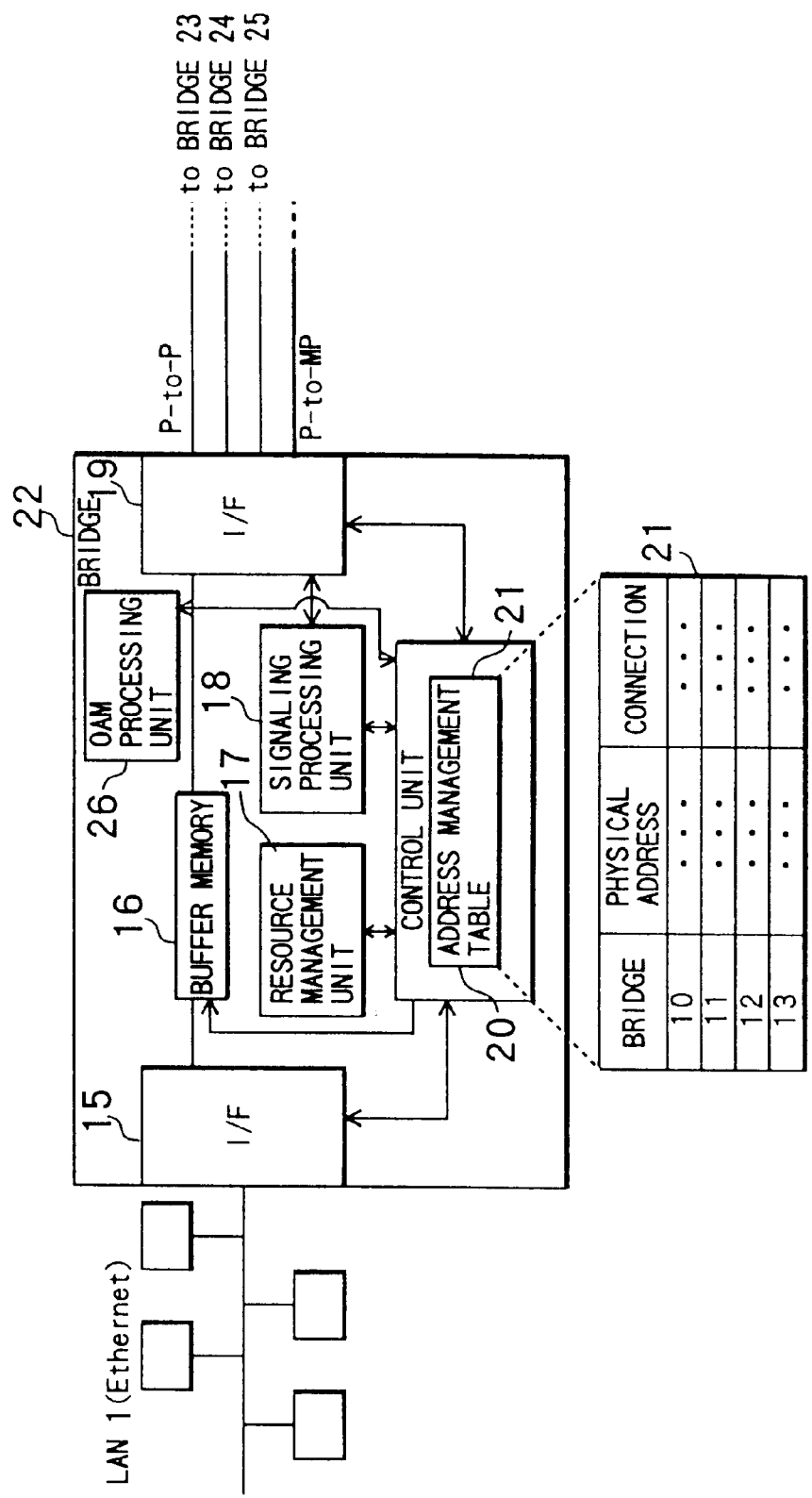
FIG. 8 is a diagram showing a construction of the bridge shown in FIG. 7.

FIG. 8 is a diagram showing a construction of the bridge shown in FIG. 7. Since the bridges 22–25 have the same construction, and therefore the bridge 22 is explained by way of an example. Referring to FIG. 8, the bridge 22 includes, in addition to the construction of the bridge 10 illustrated in FIG. 2, an OAM (Operations, Administration & Maintenance) processing unit 26 connected to the interface 19 and to the control unit 20.

The OAM processing unit 26 controls a congestion on the basis of an ABR (Available Bit Rate) service in accordance with an indication of the control unit 20. To be specific, the OAM processing unit 26 generates an RM (Resource Management) cell (which is one of OAM cells) and transmits the RM cell from the interface 19 to a connection for the OAM cells according to an indication of the control unit 20.

FIG. 9 is an explanatory diagram showing a format of the RM cell. FIG. 10 is a table for explaining the format of the RM cell. FIG. 11 is a table showing ABR parameters. Referring to FIG. 9, an "MCR (Minimum Cell Rate)" is a rate at which the root (source) is always permitted to transmit. In accordance with the embodiment 2, the MRC is set to "0" in the respective connections between the bridges 22–25.

Further, "FR (Explicit Rate)" is used for limiting an ACR (Allowed Cell Rate: a present rate at which the root is capable of transmission) of the root (source) to a specified value. Furthermore, a "CCR" is defined as an ACR of the root (source) when transmitting the RM cell.

The resource management unit 17 in the embodiment 2 monitors the upward buffer (each of the queue provided corresponding to the connection for point-to-point transmission) of the buffer memory 16, and, if there occurs a queue in which the packets are not yet accumulated, notifies the control unit 20 of this effect.

Figure 12:
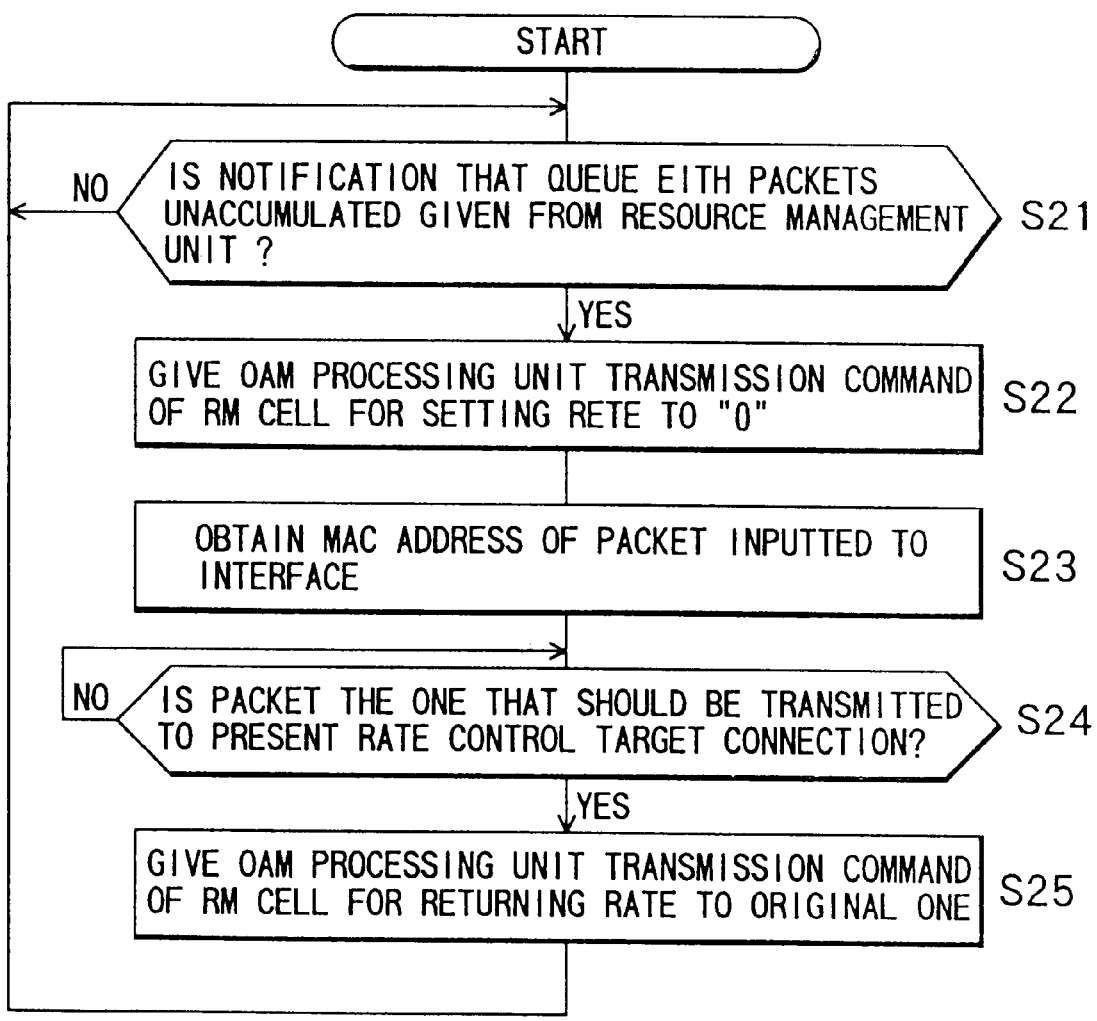
FIG. 12 is a flowchart showing a rate control process.

FIG. 12 is a flowchart showing a process (a rate control process) by the control unit 20 illustrated in FIG. 8. As shown in FIG. 12, the control unit 20 waits for the notification to be transmitted from the resource management unit 17, which purports that there occurs the queue in which the packets are not yet accumulated (S21). Then, when the resource management unit 17 notifies the control unit 20 of this purport (S21; YES), the control unit 20 judges that there is no necessity for transmitting the packets to the connection corresponding to that queue, and gives the OAM processing unit 26 a command to transmit the RM cells (S22).

The OAM processing unit 26 generates the RM cell illustrated in FIG. 9 in accordance with the transmission command of the control unit 20. At this time, the OAM processing unit 26 sets "0" in an ER field and in an MCR field of the RM cell, and the CCR field is stored with the present rate. Then, the OAM processing unit 26 transmits the RM cell to the relevant OAM cell connection from the interface 19. This RM cell corresponds to a rate decreasing message according to the present invention. Thereafter, the OAM processing unit 26 notifies the control unit 20 of a value (an original rate value) of the CCR.

Thereafter, the control unit 20 obtains an MAC address of the packet inputted to the interface 15 (S23), and judges whether or not the packet is the one that should be transmitted to the connection becoming an object of the present rate control (S24). If judged so (S24; YES) the control unit 20 gives the OAM processing unit 26 an RM cell transmission command together with the CCR value (S25), and reverts to a status of waiting again for the notification from the resource management unit 17.

The OAM processing unit 26 generates the RM cell in response to the transmission command of the control unit 20. At this time, the OAM processing unit 26 sets, in the ER field of the RM cell, the CCR value (the original rate value before being rate-controlled) received from the control unit 20. Then, the OAM processing unit 26 transmits the RM cell to the relevant OAM cell connection from the interface 19. This RM cell corresponds to a rate restoration message according to the present invention.

The RM cell transmitted from the interface 19 is transmitted through the OAM cell connection provided along the connection that is to be rate-controlled. The RM cell is thereby received by the bridge serving as the leaf through the node (the ATM switching unit) existing on the connection through which the root (the bridge from which the RM cell is transmitted) is connected to the leaf (the bridge to which the RM cell is addressed), and hen discarded by this leaf bridge.

Figure 13:
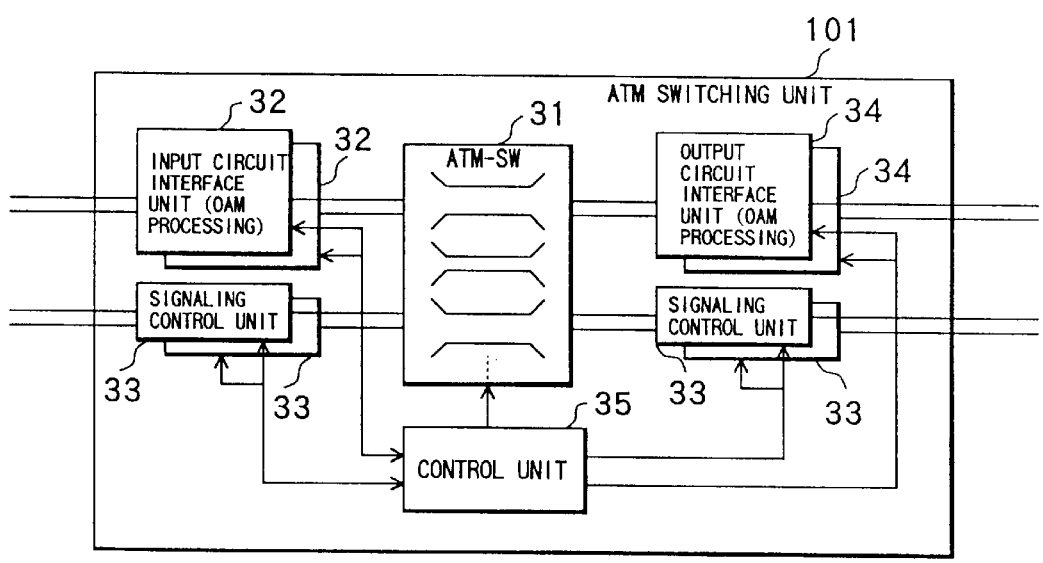
FIG. 13 is a diagram illustrating a construction of an ATM switching unit in an embodiment 2.

On the other hand, each of ATM switching units 101–104 (see FIG. 6) having received the RM cells executes the rate control of the relevant connection in accordance with a content of the RM cell. FIG. 13 is a diagram showing an example of a construction of the ATM switching unit 101. Each of the ATM switching units 102–104 has the same construction of the ATM switching unit 101.

Referring to FIG. 13, the ATM switching unit 101 is constructed of an ATM-SW 31, input circuit interface units 32 connected to the ATM-SW 31, signaling control units 33, output circuit interface units 34, and a control unit 35 connected to the ATM-SWs 31, the input circuit interface units 32, the signaling control units 33 and also the output circuit interface units 34.

Each of the input circuit interface units 32 executes a cell header conversion, monitoring of a flow rate (UPC: Usage Parameter Control) and an OAM process, and inputs the cells subjected to these processes to the ATM-SW 31. The ATM-SW 31 includes a plurality of queues for retaining per connection the cells transmitted from the input circuit interface unit 32, the reads the cells from the respective queues in accordance with a predetermined transmission rate of each connection, and transmits the cells through a relevant outgoing route.

Each of the output circuit interface units 34 forwards the cells transmitted from the ATM-SW 31 to a connection corresponding to a VPI/VCI thereof. Further, the output circuit interface unit 34 executes the OAM process. The signaling processing unit 33, responding to a request given from the root or the bridge, executes a signaling procedure (negotiation) with respect to an adjacent node (an adjacent switching unit) existing on the connection thereof.

Figure 14:
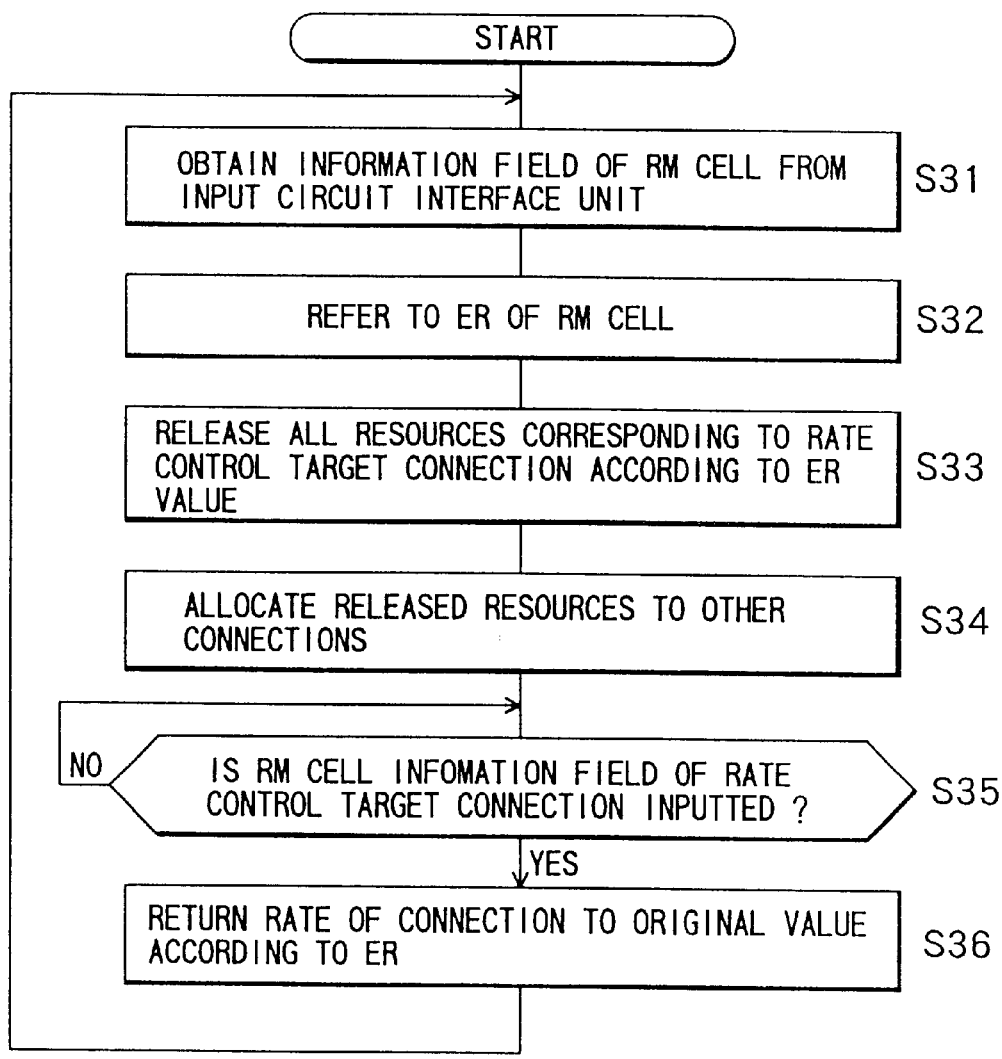
FIG. 14 is a flowchart showing the rate control process by the ATM switching unit.

The control unit 35 consists essentially of a CPU and a memory, and executes a control program stored in the memory. A variety of ATM protocol are thereby implemented. For instance, the control unit 35 executes a rate control process according to the RM cell transmitted from the bridge serving as the root. FIG. 14 is a flowchart showing the rate control process by each of the ATM switching units 101–104. Herein, the ATM switching unit 101 is exemplified.

The RM cell sent from the root is inputted to the input circuit interface unit 32 of the ATM switching unit 101. Thereupon, the input circuit interface unit 32 imparts data in an information field of this RM cell to the control unit 35, and transmits the RM cell towards the ATM-SW 31. The ATM-SW 31 inputs the RM cell to the corresponding output circuit interface unit 34. The output circuit interface unit 34 transfers the RM cell to an adjacent switching unit (a backward station) on the backward side by transmitting the RM cell to the connection on the backward side.

On the other hand, the control unit 35, upon receiving data of the information field of the RM cell from the input circuit interface unit 32 (S31), refers to an ER (Explicit Cell Rate) thereof (S32). Subsequently, the control unit 35 releases a queue (resource) corresponding to the connection to be rate-controlled in the ATM-SW 31 in accordance with a value of the ER (S33). At this time, when the ER value is "0", all the resources of the relevant connections are released.

Subsequently, the control unit 35 allocates the released resources to other connections (S34). In this case, the control unit 35 takes it into consideration that the rate of the connection returns to the original one, and allocates the released resources to only connections in which qualities such as a UBR (Unspecified Bit Rate) etc are not assured.

Thereafter, the control unit 35, when the RM cell of the rate control target connection is received by the input circuit interface unit 32, waits for the information filed data thereof to be inputted from the input circuit interface unit 32. At this time, the control unit 35, when the relevant data is inputted (S35; YES), releases the resources allocated to other connections in accordance with a value of the ER in the data, then ensures the resource of the ATM-SW 31 which is necessary enough to increase the rate up to the ER value (S36), and does a loopback of processing. If the ER value is an original rate, however, the rate of the rate control target connection is returned to a rate before being set to "0". Note that the rate control process described above is similarly executed in each of the ATM switching units 101–104 existing on the rate control target connection.

In the embodiment 2, if there is a connection to which the packet is not required to be transmitted (which is, e.g., an unused connection) among the point-to-point transmission connections for connecting the bridges, the bridge serving as the root transmits the RM cell (a rate decreasing message) to the ATM network 100. With this processing, in the ATM network 100, each of the ATM switching units existing on the rate control target connection releases all the resources of that connection (sets the rate to "0"), and allocates the released resources to other connections. Therefore, the resources of the respective ATM switching units can be effectively utilized, and the ATM network 100 can be elastically operated.

Further, each of the ATM switching units 101–104 in the ATM network 100, when receiving the RM cell (a rate restoration message) for returning the rate to the original one, returns the rate to the original one by releasing the resources allocated to other connections and allocating the resources to the previous connection. Hence, there is eliminated the necessity for disconnecting and establishing the call (connection). Accordingly, when there arises the necessity for transmitting the packets between the bridges 22–25, there is caused no such problem that the connection for transmitting the packet can not be established and an error occurs in the packet transmission. Namely, the packet transmission between the bridges 22–25 cam be assured more properly than in the prior art.

[Embodiment 3]

Next, an embodiment 3 of the present invention will be discussed. A notification of a change in rate of the connection is given by use of the RM cell. In the embodiment 3, the rate change notification is implemented by using a signaling message. A network architecture, a construction of each of the bridges 22–25 and a construction of the ATM switching unit in the embodiment 3, are the same as those in the embodiment 2 (see FIGS. 7, 8 and 13). Processes in the bridge serving as the root and in the ATM switching units are, however, different.

Figure 15:
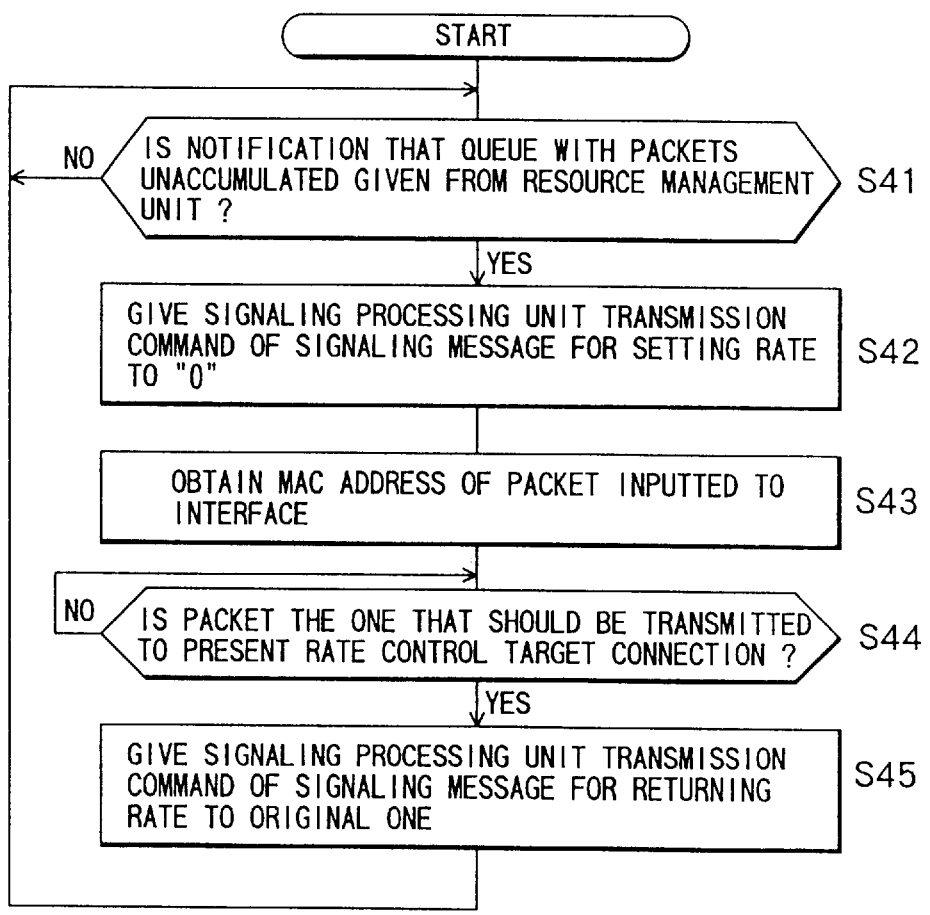
FIG. 15 is a flowchart showing the rate control process.

FIG. 15 is a flowchart showing a rate control process of the bridge in the embodiment 3. Referring to FIG. 15, what is different from the embodiment 2 is that the control unit 20 of the bridge give the signaling processing unit 18 a command of transmitting a signaling message (corresponding to the rate decreasing message according to the present invention) purporting that the rate be set to "0" in S42, and that the control unit 20 gives the signaling processing unit 18 a command of transmitting a signaling message (corresponding to the rate restoration message according to the present invention) purporting that the rate be returned to the original one in S45. Other processes are the same as those in the embodiment 2.

Figure 16:
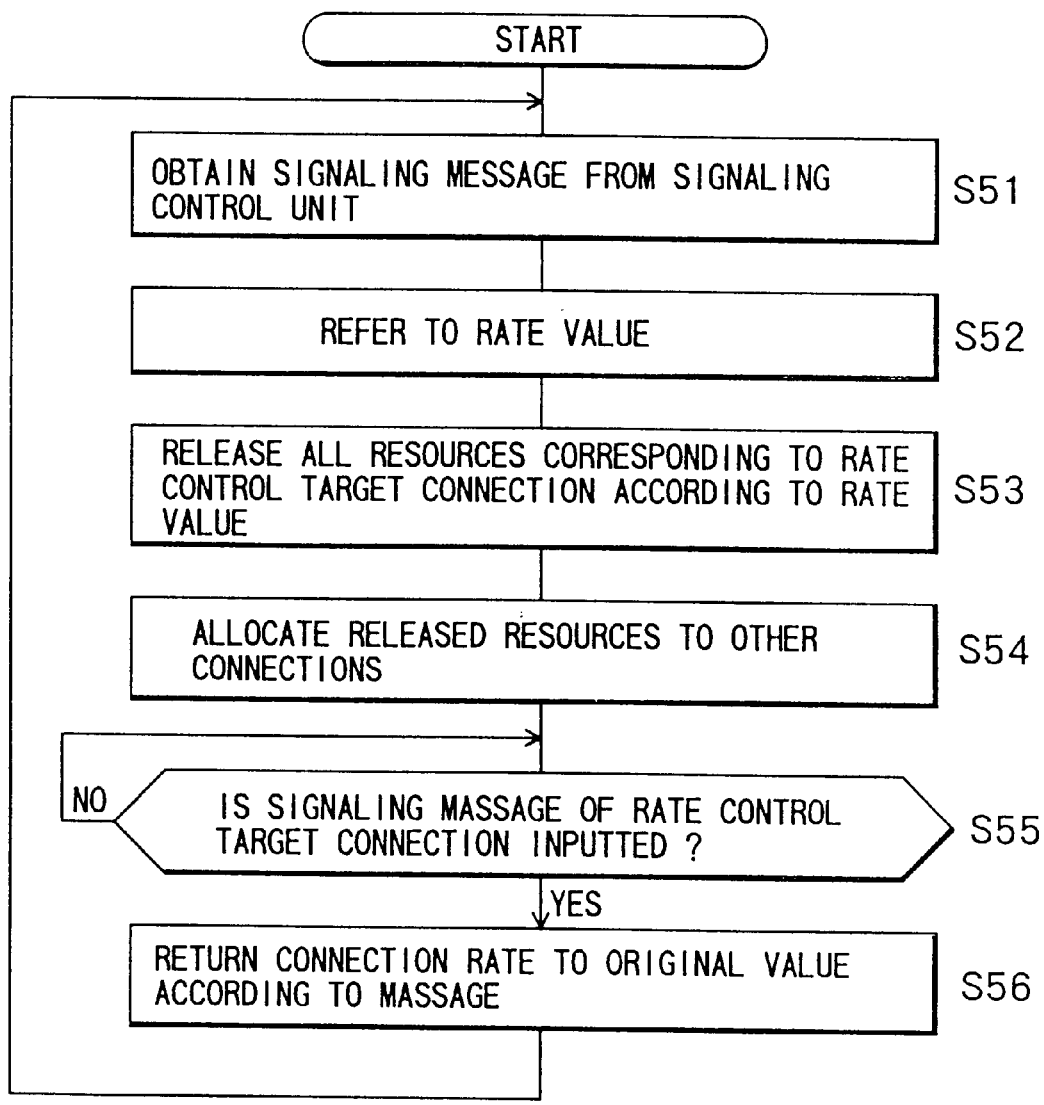
FIG. 16 is a flowchart showing the rate control process by the ATM switching unit.

Referring to FIG. 16, another difference from the embodiment 2 is that a control unit 35 of the ATM switching unit obtains the signaling message from a signaling control unit 33 in S51 and S55. Other processes are the same as those in the embodiment 2.

According to the embodiment 3, the same effects as those in the embodiment 2 can be obtained.

[Embodiment 4]

Next, an embodiment 4 of the present invention will be described. In accordance with the embodiment 4, in the network system shown in FIG. 7, there is performed the rate control of each of the point-to-multipoint transmission SVCs for connecting between the bridges 22–25.

Figure 17:
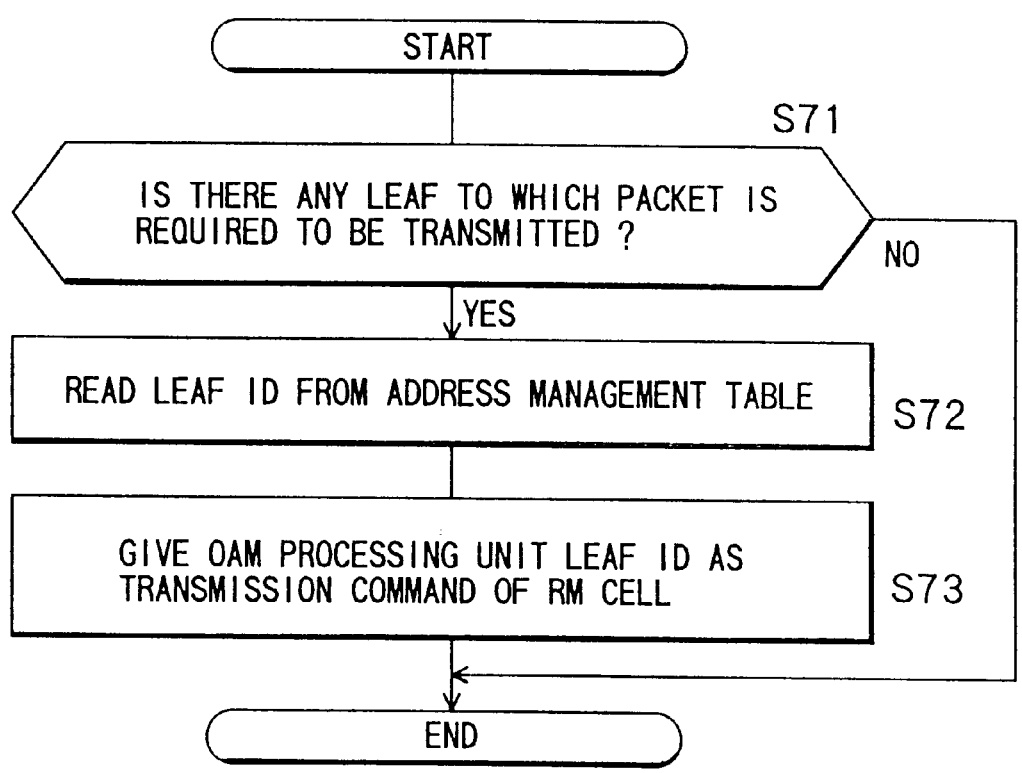
FIG. 17 is a flowchart showing the rate control process.

A network architecture, the construction of each of the bridges 22–25 and the construction of the ATM switch in the embodiment 4, are substantially the same as those in the embodiment 2 (see FIGS. 7, 8 and 13). Processes in the bridge serving as the root and in the ATM switch are, however, different. FIG. 17 shows a rate control process when the bridge serving as the root executes the point-to-multipoint transmission of the packet.

For example, the bridge 22 becoming the root performs the point-to-multipoint transmission of the packets to other bridges 22–25 serving as the leaves, in which case the control unit 20 of the bridge 22 judges whether or not there is any leaf among those leaves (the bridges 22–25), to which the packet is not required to be transmitted. (S71).

At this time, when the packets are required to be transmitted to all the leaves (S71; NO), the control unit 15 transmits the (cell stored with) packet to the relevant SVC, and finishes the rate control process. By contrast, the control unit 15, if there is the leaf to which the packet is not required to be transmitted (S71; YES), reads an identification number (a bridge serial number: referred to as a "leaf ID") from the address management table 21 (S72). Herein, it is assumed that a serial number of the bridge be read as an example. Subsequently, the control unit 20 gives the OAM processing unit 26 the leaf ID as a command of transmitting the RM cell (S73).

The OAM processing unit 26 generates the RM cell shown in FIG. 18 in accordance with the transmission command of the control unit 20. The RM cell illustrated in FIG. 18 is substantially the same as the RM cell shown in FIG. 9 except for such a point that the information field thereof is stored with the leaf ID.

At this time, the OAM processing unit 26 sets "0" in the ER field and in an MCR field of the RM cell, and stores a CCR field with the present rate. Then, the OAM processing unit 26 transmits the RM cell (corresponding to the rate decreasing message according to the present invention) to a relevant OAM cell connection from the interface 19, and notifies the control unit 20 of a CCR value.

Thereafter, the control unit 20 of the bridge 22 transmits the packet (the cell) from the point-to-multipoint transmission SVC, and finishes the processing. On the other hand, the RM cell forwarded in advance of the packet transmission from the bridge 22, is transmitted through the point-to-multipoint transmission SVC.

Herein, the point-to-multipoint transmission SVC has a tree structure passing through the ATM switching units 101–104, and the packet (the cell) is copied in the ATM switching units (the ATM switching units 102, 104 in FIG. 19) from which the connection diverges, and transmitted to the respective connections. The packet (the cell) is thereby received by each of the leaves (the bridges 22–25).

Figure 20:
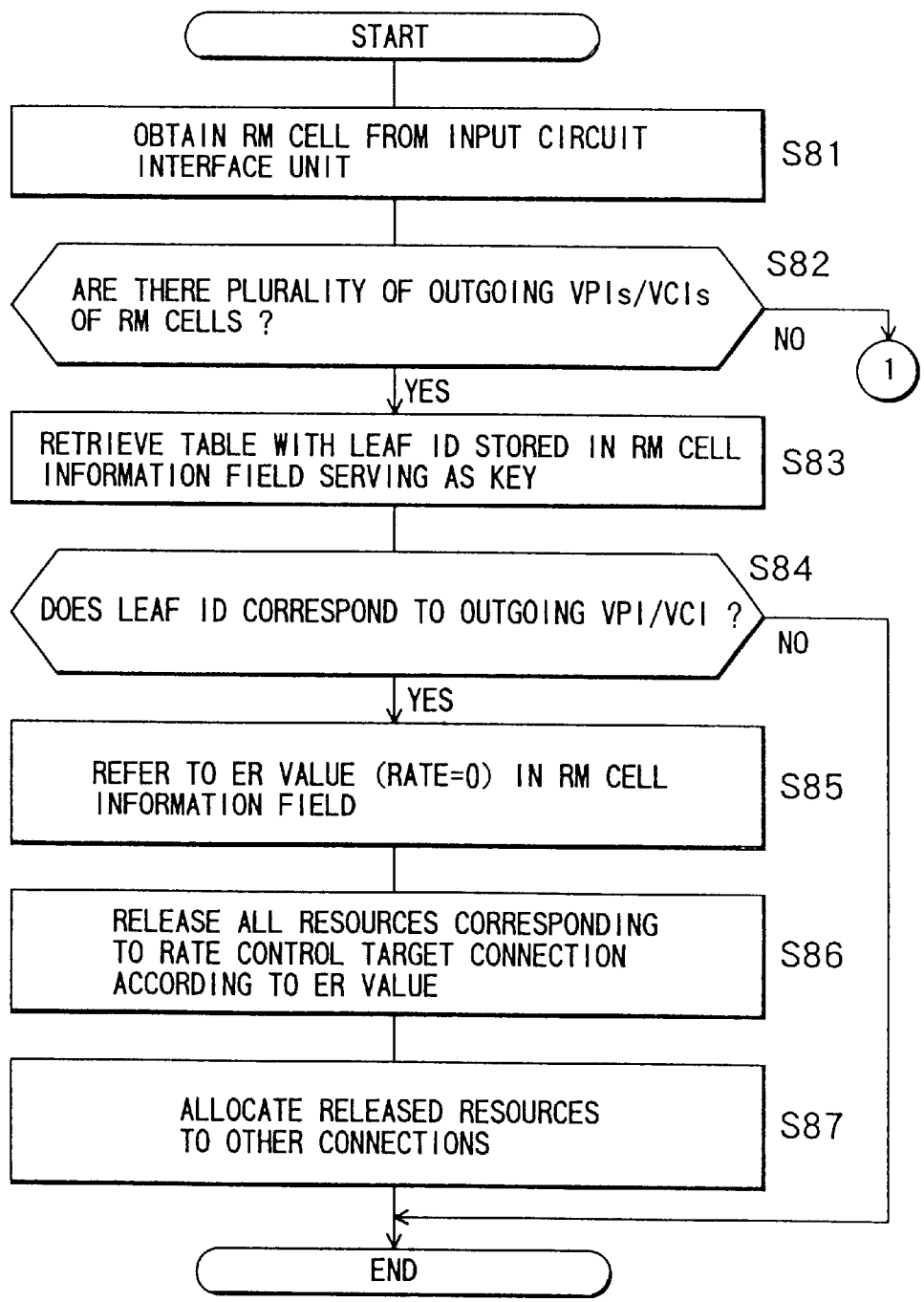
FIG. 20 is a flowchart showing the rate control process by the ATM switching unit in an embodiment 4.
Figure 21:
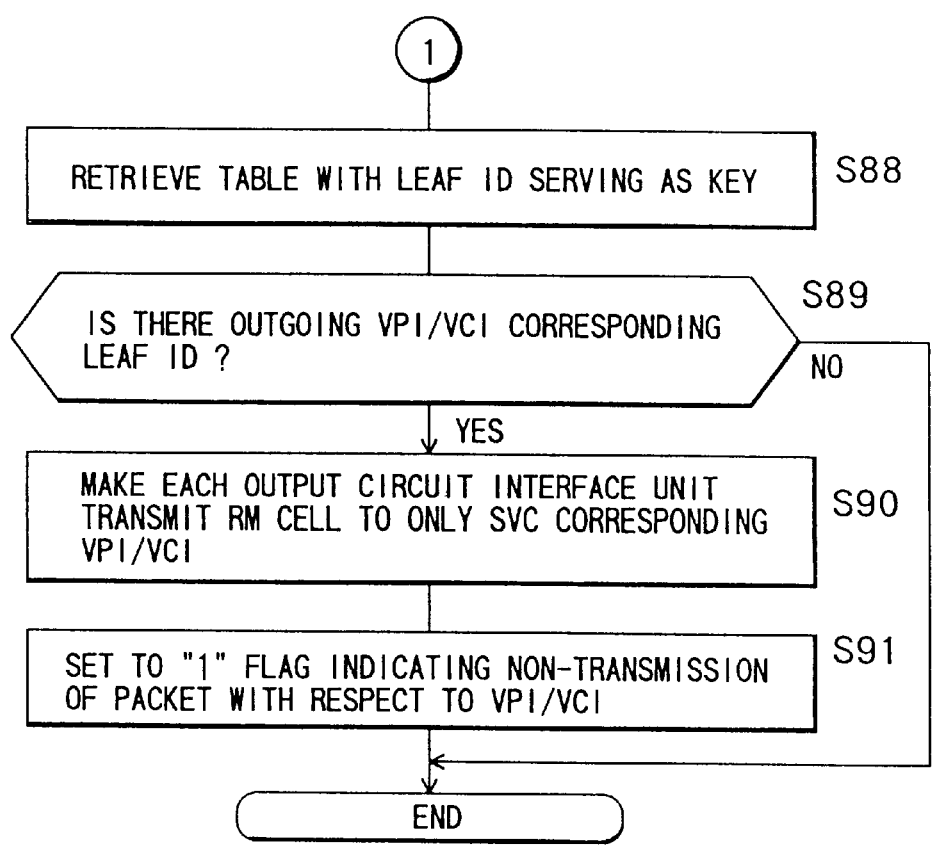
FIG. 21 is a flowchart showing the rate control process by the ATM switching unit in the embodiment 4.

Each of the ATM switching units 101–104, when receiving the RM cell, executes the processes which follow. FIG. 20 is a flowchart showing processes by the ATM switch in the embodiment 4. As a premise, however, the control unit 35 of each of the ATM switching units 101–104 includes a table (not shown) in which the outgoing VPI/VCI of the relevant SVC is set corresponding to the leaf ID.

Referring to FIG. 20, the control unit 35 of the ATM switching unit, when the RM cell is inputted thereto from the input circuit interface unit 32 (see FIG. 13) (S81), judges whether or not there are a plurality of outgoing routes (outgoing VPIs/VCIs) of that RM cell (S82).

At this time, if there is the single outgoing VPI/VCI (S82; NO), the control unit 35 retrieves the unillustrated table, in which the leaf ID stored in the information field of the RM cell is used as a key (S83), and judges whether or not the leaf ID corresponds to the outgoing VPI/VCI (S84).

In this case, if the leaf ID does not correspond thereto (S84; NO), the control unit 35 comes to an end of processing. Thereafter, the RM cell is transmitted to the backward-side ATM switching unit through the ATM-SW 31 and the output circuit interface unit 34. Whereas if the leaf ID corresponds thereto (S84; YES), the control unit 35 refers to the ER in the information field of the RM cell (S85).

Subsequently, the control unit 35 releases all the resources corresponding to the rate control target connection in accordance with the ER value (rate=0) (S86), and allocates the released resources to other connections (S87). At this time, the control unit 35, as in the embodiment 2, allocates the released resources to only the connections for the UBR etc. Then, the control unit 35 finishes the processing.

While on the other hand, there are the plurality of outgoing VPIs/VCIs (S82; YES), the control unit 35 retrieves the unillustrated table with the leaf ID serving as the key (S88), and judges whether or not there is the outgoing VPI/VCI corresponding to the leaf ID (S89). In this case, if there is not the outgoing VPI/VCI corresponding to the leaf ID (S89; NO), the control unit 35 terminates the processing. Thereafter, the RM cell is transmitted to the SVC corresponding to each outgoing VPI/VCI.

Whereas if there is the outgoing VPI/VCI corresponding to the leaf ID (S89; YES), the control unit 35 indicates each of the output circuit interface unit 34 to transmit the RM cell to only the SVC corresponding to the relevant VPI/VCI (S90), then sets a flag "1" showing a non-transmission of the packet with respect to the relevant VPI/VCI (S91), and finishes the processing.

The control unit 35 of each of the ATM switching units 101–104 shown in FIG. 20 executes the processes, whereby the ATM switching unit 101 transmits the RM cell to the ATM switching unit 102, the ATM switching unit 102 transmits the RM cell to the ATM switching unit 103, the ATM switching unit 103 transmits the RM cell to the bridge 23 corresponding to the leaf ID, and the bridge 23 discards the RM cell.

Thereafter, the packet (the cell) sent from the bridge 22 is transmitted by the ATM switching unit 102 to only the connection (on the side of the ATM switching unit 104) of the outgoing VPI/VCI in which the flag is not set to "1". Then, the packet is copied in the ATM switching unit 104 and transmitted to the leaf bridges 24, 25.

Note that the bridge 22, using the same method as that in the embodiment 2, generates the RM cell (corresponding to the rate restoration message according to the present invention) stored with the original rate ER and the leaf ID of the bridge 23, and transmits this RM cell from the point-to-multipoint transmission connection, in which case the rate control process is executed in the ATM switching unit 103, and the rate of the connection in the ATM switching unit 103 returns to the original one.

According to the embodiment 4, it is feasible to provide other connections without disconnecting the SVC with the resources of the ATM switching units existing on the point-to-multipoint transmission SVC. Therefore, the resource management is conducted more adequately than in the prior art. It is to be noted that according to the method exemplified in the embodiment 4, as in the embodiment 2, the leaf may use the signaling message (the cell for signaling) as a substitute for the RM cell. In this case, the signaling message is, as shown in FIG. 22, stored with the leaf ID.

Incidentally, the embodiment 4 has shown the example in which the rate of the connection to any one of the leaves is controlled, however, the rate control processes of the connections to the plurality of leaves may be simultaneously executed.

[Embodiment 5]

Next, an embodiment 5 is explained. In the network system illustrated in FIG. 7, the following processes are carried out if the bridge on the packet receiving side has no necessity for receiving the packet from other specified bridge.

Figure 19:
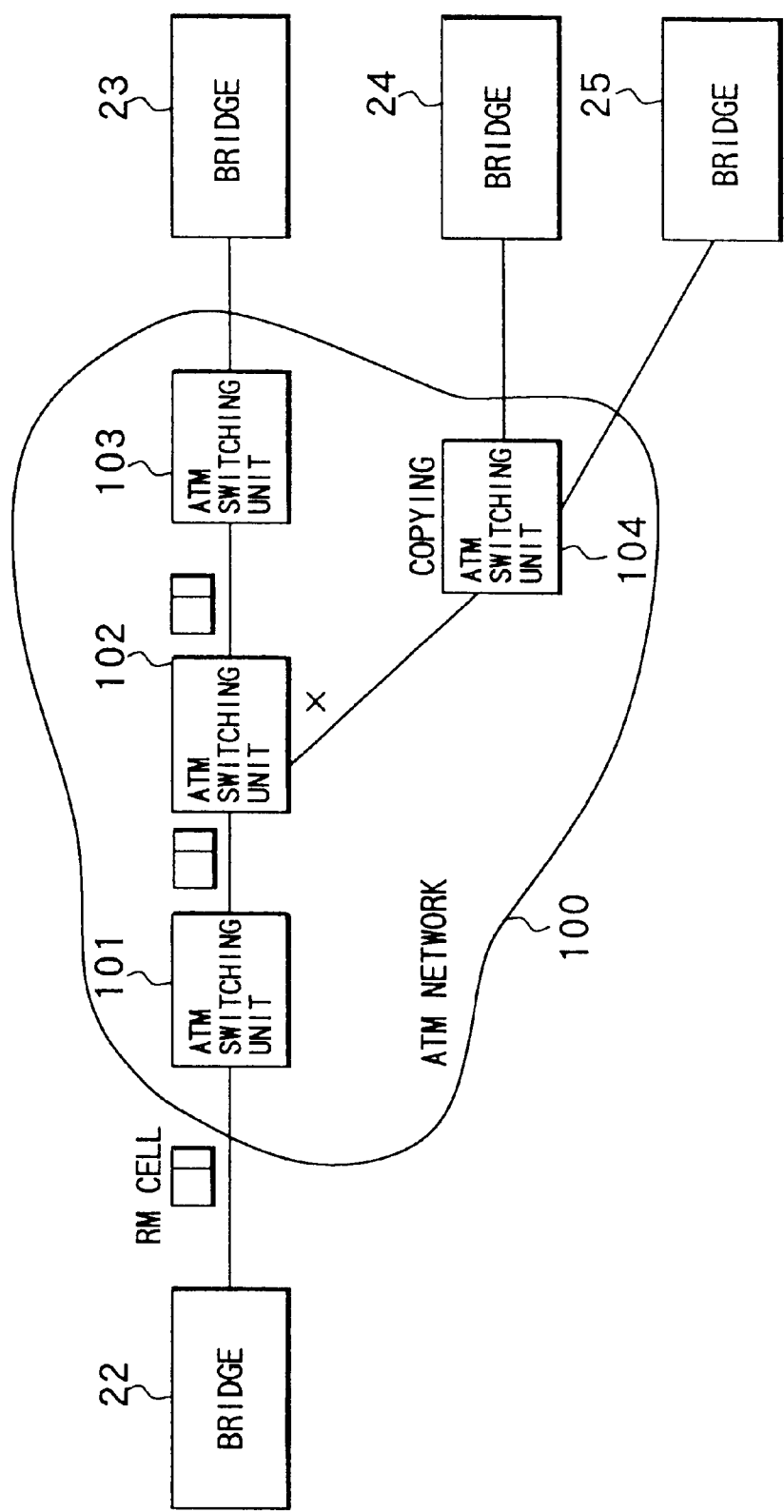
FIG. 19 is an explanatory diagram showing the ATM network.

For instance, the bridge 22 serves as the root, and the packets are transmitted to the individual bridges 22–25 by using the point-to-multipoint transmission connection, in which case when, e.g., the bridge 23 does not require the packet received from the bridge 22, the bridge 23 generate the RM cell (the rate "0") and transmits the RM cell towards the bridge 22 in order to halt a receipt of the packet from that connection. This RM cell is, as shown in FIG. 19, received by the bridge 22 through each of the ATM switching units 101–103.

At this time, the respective ATM switching units 101–103 release all the resources of the connection between the bridge 22 and the bridge 23, thereby setting the rate of the relevant connection to "0". Then, each of the ATM switching units 101–103 allocates the released resources to other connections (for the UBR). Further, when receiving the packet (the cell) addressed to the bridge 23 from the bridge 22, the cell is discarded.

The bridge 22, when receiving the RM cell from the ATM switching unit 101, discards this RM cell. At this time, the Rm cell is recorded with such a purport that the rate of the connection between the bridge 22 and the bridge 23 is set to "0". Then, the bridge 22 halts the transmission of the cell to the relevant connection. An unnecessary packet (the cell) is thereby prevented from being transmitted to the ATM network 100, and the ATM network 100 is prevented from executing an unnecessary process (a cell discarding process).

Thereafter, the bridge 22, in the case of recognizing that the rate of the relevant connection be returned to the original one (such as, e.g., transmitting a new packet (pertaining to a different piece of data) towards the bridge 23, or receiving a request for returning the rate to be original one from the bridge 23 and so on), generates the RM cell for returning the rate to the original one, and transmits the RM cell towards the bridge 23.

With this processing, each of the ATM switching units 101–103, when receiving the RM cell for returning the rate to the original one, thereafter ensures the resource of the relevant connection in which "0" is set, thereby returning the rate to the original one.

According to the embodiment 5, the bridge on the side of receiving the packet is capable of managing the resources in the ATM network 100. Further, the embodiment 5 has shown the example where the rate control is implemented by use of the RM cell, however, the rate control may also be performed by using the signaling message as a substitute for the RM cell.

Note that the connection may be the PVC or the SVC. Moreover, the same processes are executed in such a case that the connection is the point-to-multipoint transmission connection.

[Embodiment 6]

Figure 23:
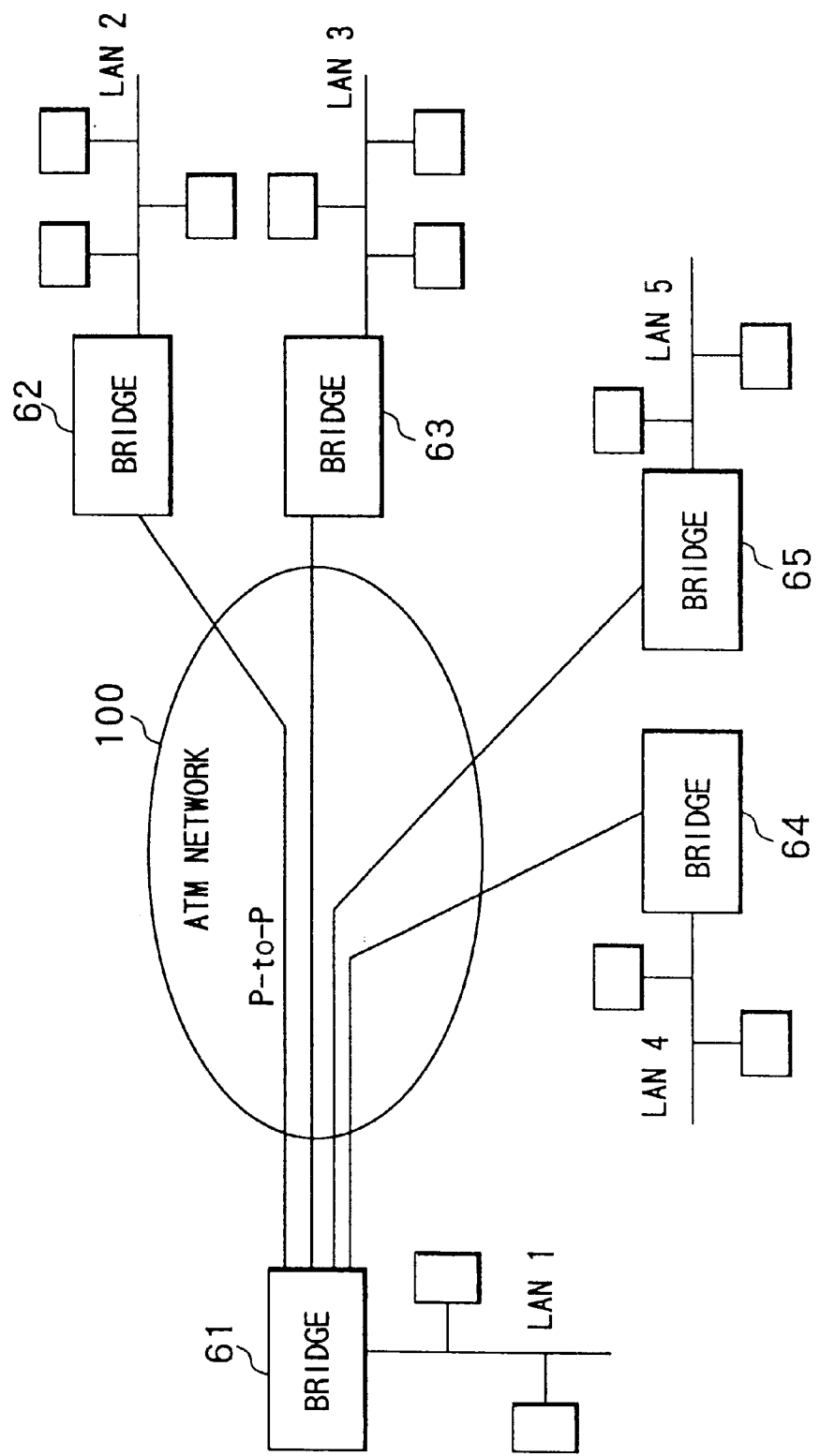
FIG. 23 is a diagram illustrating a network system architecture in an embodiment 6.

FIG. 23 is a diagram showing an architecture of the network system in an embodiment 6. As illustrated in FIG. 23, bridges 61–65 are connected to the ATM network 100, and the bridge 61 is connected to the respective bridges 62–65 through the point-to-point transmission connections. A construction of each of the bridges 61–65 is substantially the same as the one illustrated in FIG. 8.

Referring to FIG. 23, the bridge 61, if unable to specify a destination of the packet received from the LAN 1, transmits the same packet (the cell) to the point-to-point transmission connections described above. The same packets are thereby transmitted to the bridges 62–65. The same packet is corresponding to a first packet in the present invention.

The bridges 62–65, upon receiving the packets from the ATM network 100, transmit the packet to the LANs accommodated in the bridge themselves. Thereafter, each of the LANs 2–5, if the packet sent from the bridges 62–65 is not needed, discards the packets and, if necessary, generates a response packet with respect to the above packet and transmit this response packet.

At this time, it is assumed that only the LAN 2 transmits the response packet to the bridge 62, and the LANs 3–5 discard the packets. The bridge 62, upon receiving the response packet, transmits this response packet to the bridge 61 through the ATM network 100.

Then, the bridge 61 receives the response packet and refers to an address of the transmitting party, thereby recognizing that a packet destination bridge (containing a packet destination) is the bridge 62. Thereafter, the bridge 61 transmits a next packet (corresponding to a second packet in the present invention) to only the bridge 62.

According to the embodiment 6, the bridge 61, after grasping the packet destination bridge, halts the point-to-multipoint transmission (broadcasting) of the packet to other bridges, and transmits the packet to only the packet destination bridge. It is therefore feasible to refrain the ATM network 100 from transmitting unnecessary packets (the cells), whereby a processing load upon the ATM network 100 can be relieved.

Note that the connection may be limited to neither the PVC nor the SVC in the embodiment 6.

[Embodiment 7]

Figure 24:
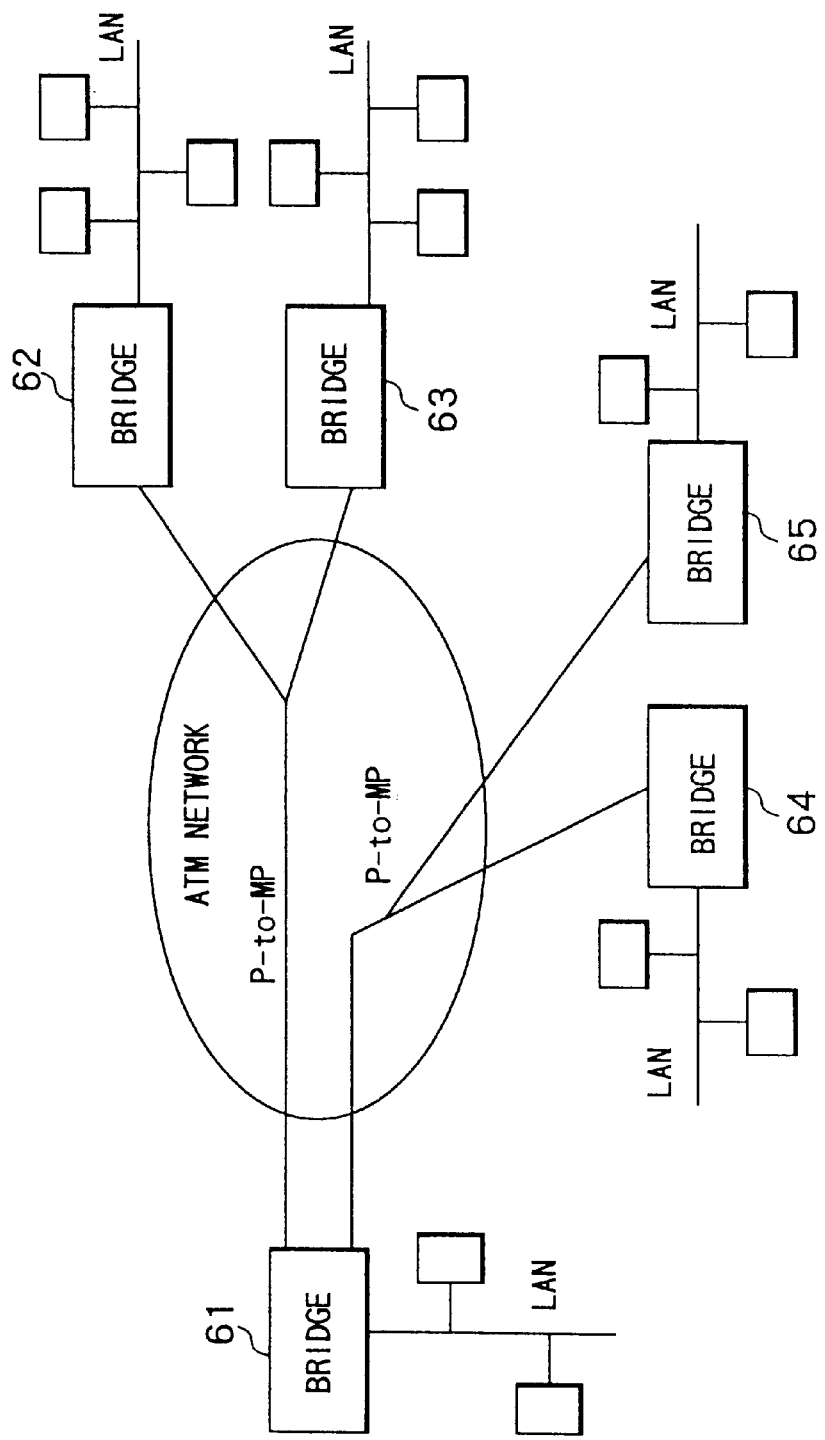
FIG. 24 is a diagram illustrating a network system architecture in an embodiment 7.
Figure 25:
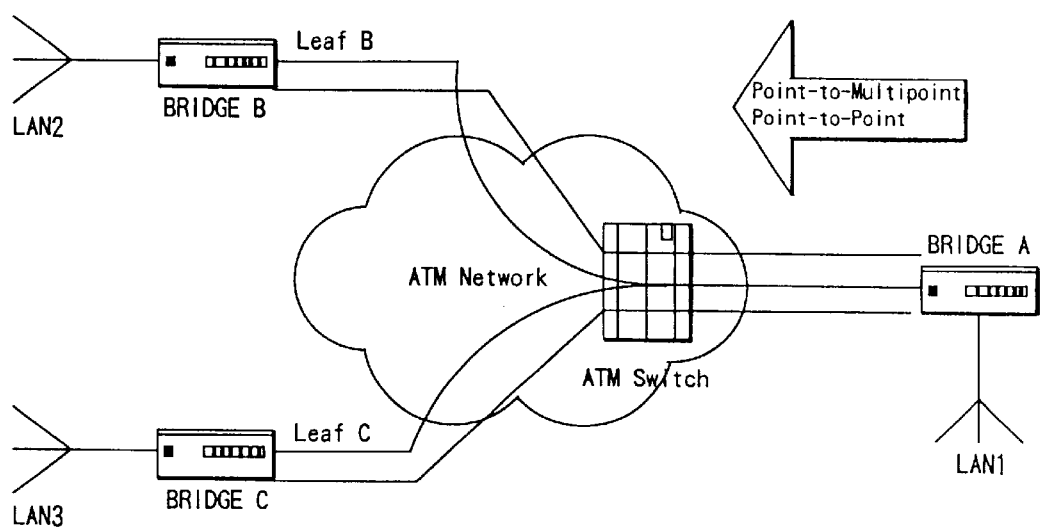
FIG. 25 is an explanatory diagram showing the prior art.
Figure 26:
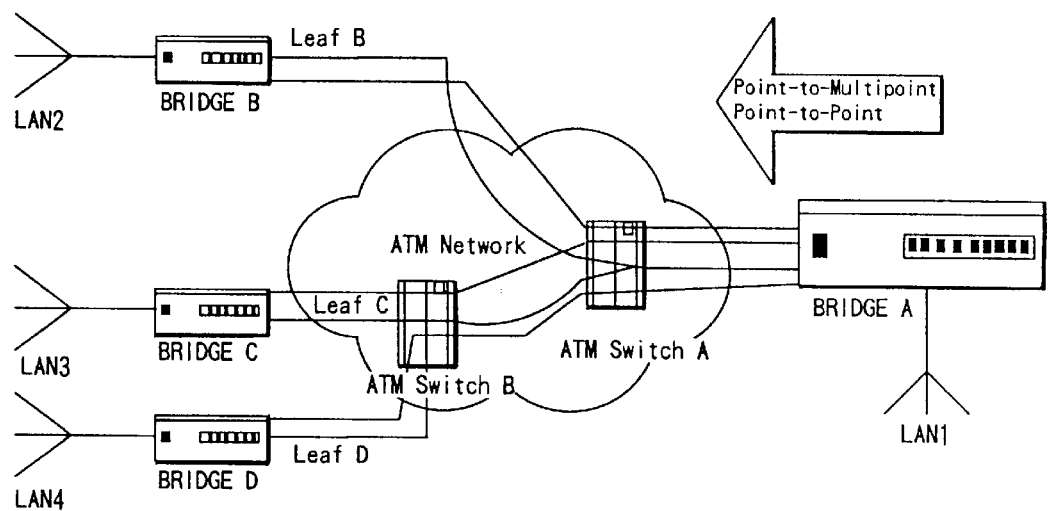
FIG. 26 is an explanatory diagram showing the prior art.

FIG. 24 is a diagram showing an architecture of the network system in an embodiment 7. As illustrated in FIG. 24, the bridges 61–65 are connected to the ATM network 100, and the bridge 61 is connected to the bridges 62, 63 through a first point-to-multipoint transmission SVC. The bridge 61 is connected to the bridges 64, 65 through a second point-to-multipoint transmission SVC. A construction of each of the bridges 61–65 is substantially the same as the one illustrated in FIG. 8.

In the network system shown in FIG. 24, the bridge 61, if unable to specify a destination of the packet received from the LAN 1, transmits the packet (the cell corresponding to a first packet in the present invention) to the first and second point-to-multipoint transmission SVCs described above. The same packet is thereby transmitted to the bridges 62–65.

The bridges 62–65, upon receiving the packets from the ATM network 100, transmit the packet to the LANs accommodated in the bridge themselves. Thereafter, each of the LANs 2–5, as in the embodiment 6, transmits the response packet or discards the packets. At this time, it is assumed that only the LAN 2 transmits the response packet to the bridge 62, while the LANs 3–5 discard the packets. The bridge 62, when receiving the response packet, transmits the response thereof packet to the bridge 61.

Then, the bridge 61 receives the response packet and refers to an address of the transmitting party, thereby recognizing that a packet destination bridge (containing a packet destination) belongs to the first point-to-multipoint transmission SVC. Thereafter, the bridge 61 transmits a next packet (corresponding to a second packet in the present invention) to only the first point-to-multipoint transmission SVC on the basis of the point-to-multipoint.

According to the embodiment 7, the bridge 61, after grasping the point-to-point transmission SVC to which the packet destination bridge belongs, transmits the packet (the cell) to only the relevant point-to-multipoint transmission SVC. It is therefore possible to relieve the processing load upon the ATM network 100 as in the embodiment 6.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A network system comprising:
    an ATM network; and
    a plurality of bridges connected through said ATM network,
    wherein each of said bridges is connected to each of other bridges through switched virtual connections or permanent virtual connections for a point-to-point transmission, and
    wherein each of said bridges, if there is an unused bridge connection in the switched virtual connections or the permanent virtual connections accommodated in said bridge, gives said ATM network a rate decreasing message of an RM cell for decreasing an allowed transmission bandwidth capacity of the unused bridge connection, and
    said ATM network, when receiving the rate decreasing message, decreases said transmission bandwidth capacity of the unused bridge connection by releasing resources allocated to the unused bridge connection, and allocates the released resources to another connection.

2. A network system according to claim 1, wherein said ATM network releases all the resources allocated to the unused bridge connection corresponding to the rate decreasing message, and thus sets the transmission bandwidth capacity of the unused bridge connection to "0".

3. A network system according to claim 1, wherein said bridge having given said ATM network the rate decreasing message, gives said ATM network a rate restoration message for increasing the transmission bandwidth capacity of said unused bridge connection, and
    said ATM network increases the transmission bandwidth capacity of said unused connection in accordance with the rate restoration message.

4. A network system according to claim 3, wherein said ATM network returns the transmission bandwidth capacity of the unused bridge connection to a value before receiving the rate decreasing message in accordance with the rate restoration message.

5. A network system according to claim 1, wherein each of said bridges, if each of said bridges transmits the rate decreasing message to said ATM network, generates a resource management cell containing the rate decreasing message, and transmits the resource management cell to said ATM network.

6. A network system according to claim 1, wherein each of said bridges, if each of said bridges transmits the rate decreasing message to said ATM network, generates a signaling cell containing the rate decreasing message, and transmits the signaling cell to said ATM network.

7. A network system comprising:
    an ATM network; and
    a plurality of bridges connected through said ATM network,
    wherein a specified bridge among said plurality of bridges is connected to other bridges through switched virtual connections for a point-to-multipoint transmission, and
    wherein said specified bridge, when transmitting a packet to each of said other bridges by use of said switched virtual connections, and if there is another bridge not requiring the packet, gives said ATM network a rate decreasing message of an RM cell for decreasing an allowed transmission bandwidth capacity of a target connection which is used only for transmitting a packet to said other bridge, and
    said ATM network releases resources allocated to the target connection corresponding to the rate decreasing message, thus decreases said transmission bandwidth capacity of the target connection, and allocates the released resources to another connection.

8. A network system according to claim 7, wherein said ATM network releases all the resources allocated to the target connection corresponding to the rate decreasing message, and thus sets said transmission bandwidth capacity of the target connection to "0".

9. A network system according to claim 7, wherein said bridge having given said ATM network the rate decreasing message, gives said ATM network a rate restoration message for increasing said transmission bandwidth capacity of said target connection, and said ATM network increases the transmission bandwidth capacity of said target connection in accordance with the rate restoration message.

10. A network system according to claim 9, wherein said ATM network returns the transmission bandwidth capacity of the target connection to a value before receiving the rate decreasing message in accordance with the rate restoration message.

11. A network system comprising:
an ATM network; and
a plurality of bridges connected through said ATM network,
wherein each of said bridges is connected to other bridges through switched virtual connections or permanent virtual connections for a point-to-point transmission, or switched virtual connections for a point-to-multipoint transmission, and
wherein each of said bridges, if a packet received from another bridge is unnecessary, gives said ATM network a rate decreasing message of an RM cell for decreasing an allowed transmission bandwidth capacity of an unused target connection connected said other bridge and said bridge, and
said ATM network releases resources allocated to the target connection corresponding to the rate decreasing message, thus decreases said transmission bandwidth capacity of the target connection, and allocates the released resources to another connection.

12. A network system according to claim 11, wherein said ATM network, after receiving the rate decreasing message, discards cells received from said other bridge through the target connection corresponding to the rate decreasing message.

13. A network system according to claim 12, wherein said ATM network transfers the rate decreasing message to said other bridge,
said other bridge, after receiving the rate decreasing message from said ATM network, if said other bridge transmits a packet to said bridge having sent the rate decreasing message, gives said ATM network a rate restoration message for increasing the transmission bandwidth capacity of the target connection, and
said ATM network increases the transmission bandwidth capacity of the target connection corresponding to the rate restoration message.

14. A network system according to claim 11, wherein said ATM network transfers the rate decreasing message to said other bridge, and
said other bridge halts a transmission of cells to the target connection corresponding to the rate decreasing message.

15. A network system according to claim 14, wherein said ATM network transfers the rate decreasing message to said other bridge,
said other bridge, after receiving the rate decreasing message from said ATM network, if said other bridge transmits a packet to said bridge having sent the rate decreasing message, gives said ATM network a rate restoration message for increasing the transmission bandwidth capacity of the target connection, and
said ATM network increases the transmission bandwidth capacity of the target connection corresponding to the rate restoration message.

16. A network system according to claim 11, wherein said ATM network transfers the rate decreasing message to said other bridge,
said other bridge, after receiving the rate decreasing message from said ATM network, if said other bridge transmits a packet to said bridge having sent the rate decreasing message, gives said ATM network a rate restoration message for increasing the transmission bandwidth capacity of the target connection, and
said ATM network increases the transmission bandwidth capacity of the target connection corresponding to the rate restoration message.

17. A network system according to claim 16, wherein said ATM network returns the transmission bandwidth capacity of the target connection to a value before receiving the rate decreasing message in accordance with the rate restoration message.

18. A network system according to claim 11, wherein each of said bridges, if each of said bridges transmits the rate decreasing message to said ATM network, generates a resource management cell containing the rate decreasing message, and transmits the resource management cell to said ATM network.

19. A network system according to claim 11, wherein each of said bridges, if each of said bridges transmits the rate decreasing message to said ATM network, generates a signaling cell containing the rate decreasing message, and transmits the signaling cell to said ATM network.

20. A bridge connected through an ATM network to a plurality of other bridges,
wherein said bridge is connected to each of said other bridges through switched virtual connections or permanent virtual connections for a point-to-point transmission, and
wherein said bridge, if there is an unused bridge connection in the switched virtual connections or the permanent virtual connections, gives said ATM network a rate decreasing message, of an RM cell and thus makes said ATM network decrease an allowed transmission bandwidth capacity of the unused bridge connection corresponding to the rate decreasing message.

21. A bridge according to claim 20, wherein said bridge, after giving said ATM network the rate decreasing message, gives said ATM network a rate restoration message for increasing the transmission bandwidth capacity of the unused bridge connection corresponding to the rate decreasing message.

22. A bridge connected through an ATM network to a plurality of other bridges,
wherein said bridge is connected to said other bridges through switched virtual connections for a point-to-multipoint transmission, and
wherein said bridge, when transmitting a packet to said other bridges by use of the connections, and if there is another bridge not requiring the packet, gives said ATM network a rate decreasing message of an RM cell for decreasing an allowed transmission bandwidth capacity of an unused target connection which is used only for transmitting a packet to said other bridge in the connections, and thus makes said ATM network decrease the transmission bandwidth capacity of the target connection corresponding to the rate decreasing message.

23. A bridge according to claim 22, wherein said bridge, after giving said ATM network the rate decreasing message, gives said ATM network a rate restoration message for increasing the transmission bandwidth capacity of the target connection corresponding to the rate decreasing message.

24. A bridge connected through an ATM network to a plurality of other bridges, wherein said bridge is connected through switched virtual connections or permanent virtual connections for a point-to-point transmission to said other bridges, and wherein said bridge, if a packet received from another bridge is unnecessary, gives said ATM network a rate decreasing message of an RM cell for decreasing an allowed transmission bandwidth capacity of an unused target connection for connecting said bridge with said other bridge, and thus makes said ATM network decrease the transmission bandwidth capacity of the target connection corresponding to the rate decreasing message.

25. A bridge according to claim 24, wherein said bridge, when transmitting a packet to another bridge after receiving the rate decreasing message sent from said other bridge, gives said ATM network a rate restoration message for increasing the transmission bandwidth capacity of the target connection for connecting said bridge with said other bridge.

26. A bridge according to claim 24, wherein said bridge generates a resource management cell containing the rate decreasing message, and transmits the resource management cell to said ATM network.

27. A bridge according to claim 24, wherein said bridge generates a signaling cell containing the rate decreasing message, and transmits the signaling cell to said ATM network.

* * * * *